(12) United States Patent
Guo et al.

(10) Patent No.: US 8,547,504 B2
(45) Date of Patent: Oct. 1, 2013

(54) DISPLAY DEVICE HAVING PLASMONIC COLOR FILTERS AND PHOTOVOLTAIC CAPABILITIES

(75) Inventors: Lingjie Jay Guo, Ann Arbor, MI (US); Ting Xu, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 231 days.

(21) Appl. No.: 13/095,365

(22) Filed: Apr. 27, 2011

(65) Prior Publication Data

US 2011/0285942 A1 Nov. 24, 2011

Related U.S. Application Data

(60) Provisional application No. 61/328,335, filed on Apr. 27, 2010.

(51) Int. Cl.
*G02F 1/1335* (2006.01)

(52) U.S. Cl.
USPC .......................................................... 349/96

(58) Field of Classification Search
None
See application file for complete search history.

(56) References Cited

U.S. PATENT DOCUMENTS

| | | | |
|---|---|---|---|
| 5,570,139 A | 10/1996 | Wang | |
| 5,986,808 A | 11/1999 | Wang | |
| 6,031,653 A | 2/2000 | Wang | |
| 6,046,401 A | 4/2000 | McCabe | |
| 6,097,456 A | 8/2000 | Wang | |
| 6,924,859 B2 | 8/2005 | Ishii et al. | |
| 7,106,402 B2 | 9/2006 | Suzuki et al. | |
| 7,248,297 B2 * | 7/2007 | Catrysse et al. | 348/273 |
| 7,648,767 B2 | 1/2010 | Fu et al. | |
| 7,649,597 B2 | 1/2010 | Ikeno et al. | |
| 8,130,440 B2 | 3/2012 | Kothari et al. | |
| 2006/0147617 A1* | 7/2006 | Chen et al. | 427/162 |
| 2006/0262250 A1* | 11/2006 | Hobbs | 349/96 |
| 2006/0286663 A1 | 12/2006 | Cunningham et al. | |

(Continued)

FOREIGN PATENT DOCUMENTS

| | | |
|---|---|---|
| EP | 1571467 | 9/2005 |
| WO | WO 2011/112714 | 9/2011 |
| WO | WO 2011/139785 | 11/2011 |
| WO | WO 2012/145677 | 10/2012 |

OTHER PUBLICATIONS

Barnes, William L., et al., "Surface plasmon subwavelength optics," Nature, vol. 424, pp. 824-830 (Aug. 14, 2003).

(Continued)

*Primary Examiner* — Sung Pak
(74) *Attorney, Agent, or Firm* — Harness, Dickey & Pierce, P.L.C.

(57) ABSTRACT

A plasmonic optical spectrum filtering device is provided that filters electromagnetic waves by optical resonance, for example, by selective conversion between the free-space waves and spatially confined modes in plasmonic nano-resonators. Frequency-selective transmission and reflection spectra are engineered and can be used as spectrum filters for display and imaging applications. A thin film stack color filter is further disclosed, which can be designed to either function as a transmission color filter with efficiency twice that of conventional colorant based color filter; or as a reflective color filter for display devices (e.g., used in an energy harvesting reflective display). In other variations, a novel reflective colored display is viewable under direct sunlight, and can simultaneously harvest both incident light and generate electrical power. Methods of making such plasmonic optical spectrum filtering devices are also provided.

26 Claims, 20 Drawing Sheets

(56) References Cited

U.S. PATENT DOCUMENTS

| | | | |
|---|---|---|---|
| 2007/0019292 A1* | 1/2007 | Kim et al. | 359/486 |
| 2007/0102035 A1 | 5/2007 | Yang | |
| 2009/0046362 A1 | 2/2009 | Guo et al. | |
| 2009/0219623 A1 | 9/2009 | Shalaev et al. | |
| 2009/0256287 A1 | 10/2009 | Fu et al. | |
| 2010/0002979 A1 | 1/2010 | Diest et al. | |
| 2010/0091217 A1* | 4/2010 | Kim et al. | 349/62 |
| 2012/0086887 A1* | 4/2012 | Lee et al. | 349/62 |
| 2012/0268809 A1* | 10/2012 | Guo et al. | 359/359 |
| 2012/0287362 A1* | 11/2012 | Hashimura et al. | 349/15 |

OTHER PUBLICATIONS

Chen, Qin, et al., "High transmission and low color cross-talk plasmonic color filters using triangular-lattice hole arrays in aluminum films," Optics Express, vol. 18, No. 13, pp. 14056-14062 (Jun. 21, 2010) (published online Jun. 15, 2010).

Diest, Kenneth, et al., "Tunable Color Filters Based on Metal-Insulator-Metal Resonators," Nano Letters, vol. 9, No. 7, pp. 2579-2583 (2009) (published online Jun. 15, 2009) (Abstract only).

Ebbesen, T.W., et al., "Extraordinary optical transmission through sub-wavelength hole arrays," Nature, vol. 391, pp. 667-669 (Feb. 12, 1998).

Genet, C., et al., "Light in tiny holes," Nature, vol. 445, pp. 39-46 (Jan. 4, 2007).

Inoue, Daisuke, et al., "Polarization independent color filter comprising an aluminum film with surface-plasmon enhanced transmission through a subwavelength array of holes," Applied Physics Letters, vol. 98, No. 9, pp. 093113-093115 (2011) (published online Mar. 2, 2011) (Abstract only).

Laux, Eric, et al., "Plasmonic photon sorters for spectral and polarimetric imaging," Nature Photonics, vol. 2, pp. 161-164 (2008) (published online Feb. 24, 2008) (Abstract only).

Lee, Hong-Shik, et al., "Color filter based on a subwavelength patterned metal grating," Optics Express, vol. 15, No. 23, (Nov. 12, 2007) (published online Nov. 6, 2007).

Lezec, H.J., et al., "Beaming Light from a Subwavelength Aperture," Science, vol. 297, pp. 820-822 (Aug. 2, 2002) (published online Jun. 20, 2002).

Li, Zili, et al., "14.3: Photovoltaic Cell Integrated into a Reflective LCD," Society for Information Display Symposium Digest of Technical Papers, vol. 33, No. 1, pp. 190-193 (May 2002) (Abstract only).

Nguyen-Huu, Nghia, et al., "Color filters featuring high transmission efficiency and broad bandwidth based on resonant waveguide-metallic grating," Optics Communications, vol. 284, No. 10-11, pp. 2473-2479 (May 15, 2011) (Abstract only).

Shen, J.T., et al., "Mechanism for Designing Metallic Metamaterials with a High Index of Refraction," Physical Review Letters, vol. 94, No. 19, pp. 197401-1-197401-4 (May 17, 2005).

Thio, Tineke, et al., "Enhanced light transmission through a single subwavelength aperture," Optics Letters, vol. 26, No. 24, pp. 1972-1974 (2001).

Wang, Yu, "Liquid crystal display efficiency enhancement using low-absorption color filters and color recyling," http://trs-new.jpl.nasa.gov/dspace/bitstream/2014/16461/1/00-2514.pdf (downloaded on May 13, 2013).

Xu, Ting, et al., "Plasmonic nanoresonators for high-resolution colour filtering and spectral imaging," Nature Communications, vol. 1, p. 1058 (Aug. 24, 2010).

Xue, Yinfei, et al., "Compound polarized wavelength filters with a single subwavelength structure," Optics Communications, vol. 284, No. 1, pp. 501-509 (Jan. 1, 2011) (Abstract only).

Ye, Yan, et al., "Color filter based on a submicrometer cascaded grating," Optics Communications, vol. 283, No. 4, pp. 613-616 (Feb. 15, 2010) (Abstract only).

Ye, Yan, et al., "Polarizing color filter based on a subwavelength metal-dielectric grating," Applied Optics, vol. 50, No. 10, pp. 1356-1363 (Apr. 1, 2011) (Abstract only).

Yoon, Yeo-Taek, et al., "Color filter incorporating a subwavelength patterned grating in poly silicon," Optics Express, vol. 16, No. 4, pp. 2374-2380 (Feb. 18, 2008) (published online Feb. 5, 2008).

International Search Report and Written Opinion of the International Searching Authority issued on Dec. 21, 2011 for related cross-referenced PCT International Application No. PCT/US2011/034174 (published as WO 2011/139785).

International Preliminary Report on Patentability issued on Dec. 30, 2012 for related cross-referenced PCT International Application No. PCT/US2011/034174 (published as WO 2011/139785).

International Search Report and Written Opinion of the International Searching Authority issued on Nov. 28, 2012 for cross-referenced PCT International Application No. PCT/US2012/034526 (published as WO 2012/145677).

\* cited by examiner

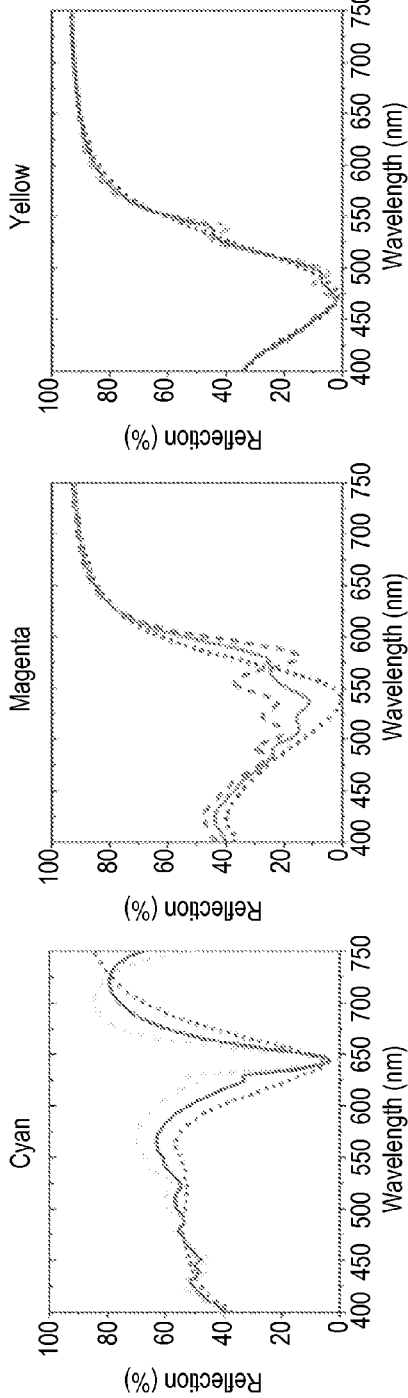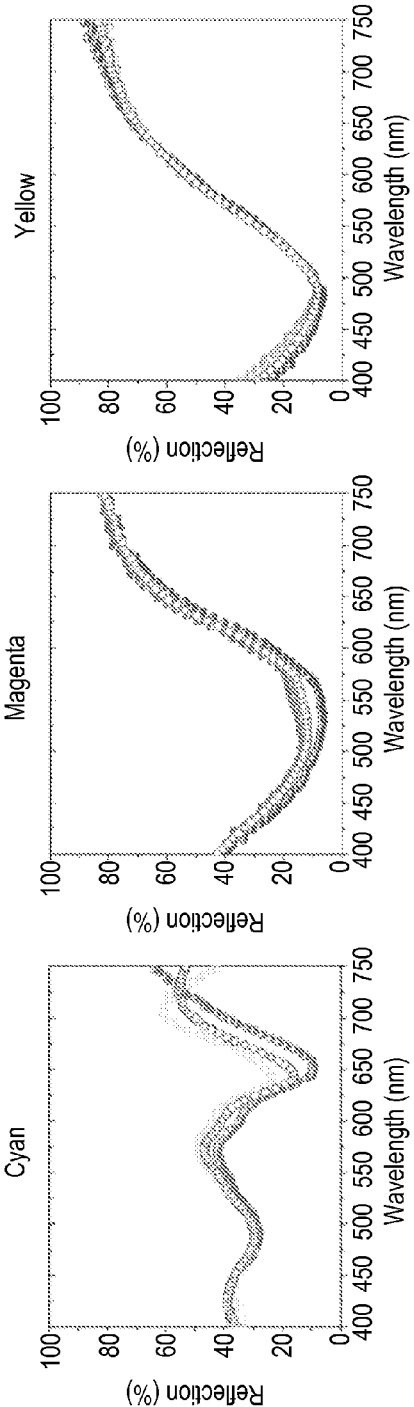

FIG. 12A
FIG. 12B
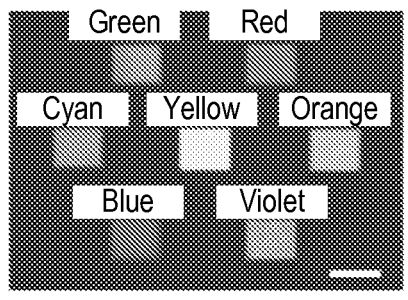
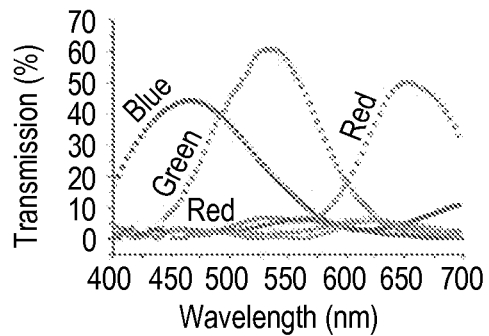
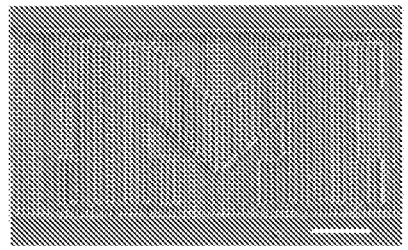
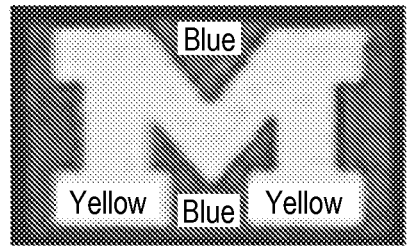
FIG. 12C
FIG. 12D
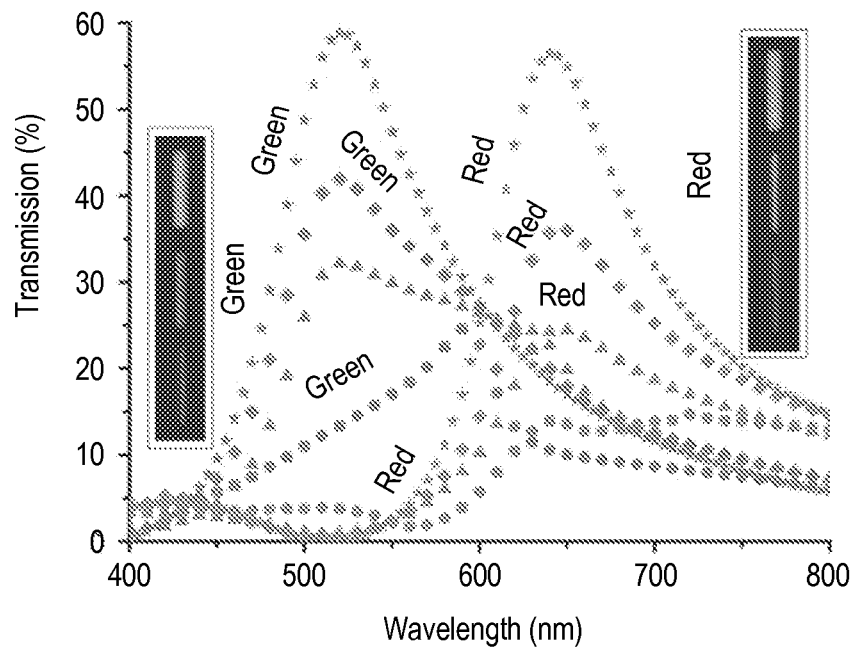
FIG. 13

FIG. 14A            FIG. 14B
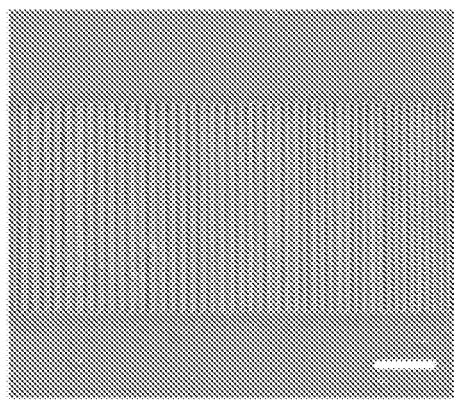 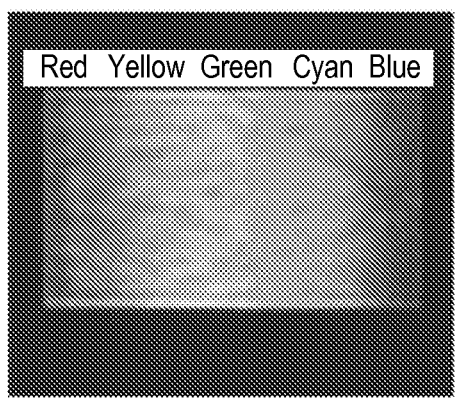
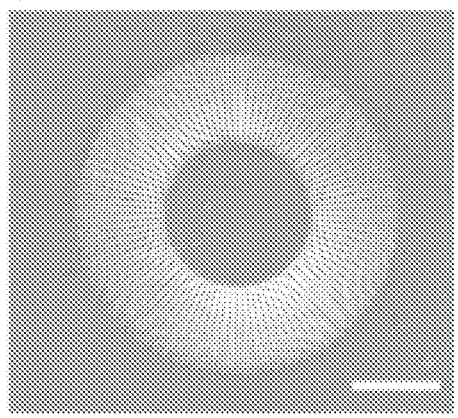 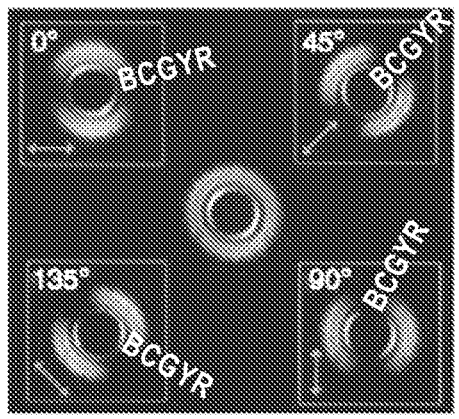
FIG. 14C            FIG. 14D

FIG. 18A
FIG. 18B
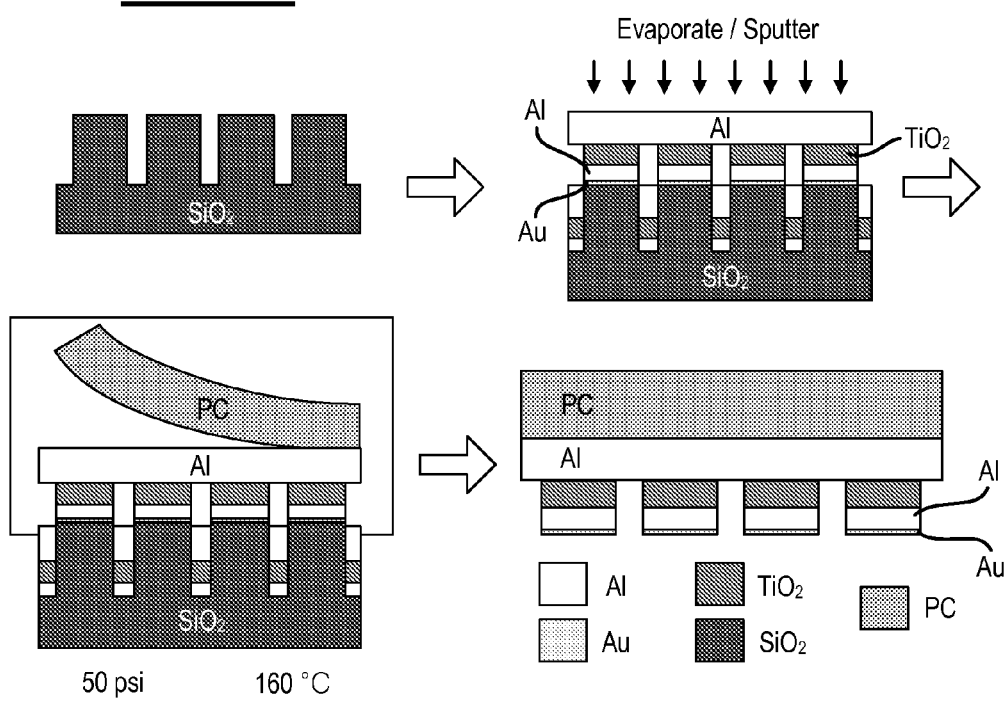
FIG. 18C
FIG. 18D
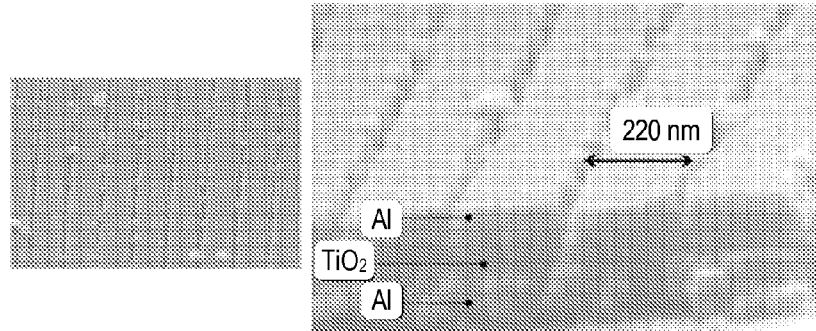
FIG. 19A
FIG. 19B

Structure parameters:
Period: 300nm, 350nm, 450nm.
Buffer layer: 50nm silica
$Si_3N_4$: 100nm
Al Grating DC~0.25

Blue  Green  Red

DISPLAY DEVICE HAVING PLASMONIC COLOR FILTERS AND PHOTOVOLTAIC CAPABILITIES

CROSS-REFERENCE TO RELATED APPLICATIONS

This application claims the benefit of U.S. Provisional Application No. 61/328,335, filed on Apr. 27, 2010. The entire disclosure of the above application is incorporated herein by reference.

FIELD

The present disclosure relates to spectrum filtering devices for display devices such as liquid crystal displays, projection displays like liquid crystal on Si (LCoS), eye-wear displays, as well as plasmonic color filters, which can also have photovoltaic capabilities.

BACKGROUND

This section provides background information related to the present disclosure which is not necessarily prior art.

Display devices occupy an increasingly large fraction of surface area in many computing devices. Energy efficiency is becoming ever more important for a green and sustainable future. As global energy demand continues to grow to meet the needs and aspirations of people across the world, ways to improve energy efficiency and harvest energy are essential. However, little attention has been paid to the significant light energy wasted in displays used in everyday lives. For example, in the prevailing liquid crystal displays (LCD), only 3-8% of the backlight reaches a viewer's eyes, where most of light energy is absorbed by the colorant-based filters and polarizers.

Color and spectral imaging systems in display devices typically use filters and glass prisms to disperse light of different wavelengths. Transmissive optical filters are widely utilized in various display applications, including flat panel screens, like liquid crystal display (LCD) panels. Optical wavelength filters are devices that reflect or transmit light of a desired wavelength or within a certain wavelength range. For example, a transmissive filter selectively transmits light within a preselected wavelength transmission bandwidth, while absorbing or reflecting light of wavelengths outside the transmission bandwidth. Such optical filtering for wavelength provides a way to control the energy and spectral composition of light and is widely used in display applications.

To produce color images, existing display devices produce three primary colors, typically, red, green, and blue, collectively referred to as "RGB." Conventional optical filters use pigment dispersions to filter and produce RGB colors for display pixels. Light of complementary colors are absorbed and completely wasted. Such optical filters are typically manufactured by four separate processes, which not only complicates manufacturing, but also wastes chemical materials in the process. Thus, such optical filters have relatively low energy efficiency, while adding significantly to the overall cost and size of the display device. Currently used polarizers in LCD displays achieve the polarization function by absorbing light of the orthogonal polarization and the absorbed light is also wasted.

With the miniaturization of integrated devices, there is a need for a new paradigm in color filter technology that can produce optical filters in the visible range with higher transmission efficiency and reduced manufacturing complexity to provide devices with high energy efficiency, low power consumption, and slim dimension. Furthermore, it would be desirable to have display devices capable of recycling or harvesting absorbed energy to generate useful electrical power, especially for devices such as electronic books that consume relatively small amounts of power, or mobile devices (such as cell phones) that are in standby mode 95% of the time.

Further areas of applicability will become apparent from the description provided herein. The description and specific examples in this summary are intended for purposes of illustration only and are not intended to limit the scope of the present disclosure.

SUMMARY

This section provides a general summary of the disclosure, and is not a comprehensive disclosure of its full scope or all of its features.

According to various aspects of the present teachings, a plasmonic optical spectrum filtering device is provided that comprises a resonator structure. The resonator structure comprises an electrically conductive metal grating structure and a dielectric material. The electrically conductive metal grating structure comprises at least two openings capable of transmitting a portion of an electromagnetic spectrum to generate a filtered output having a predetermined range of wavelengths. The filtering occurs at least in part via an optical resonance process.

In other aspects, the principles of the present disclosure provide a display device comprising a display pixel of a display screen. The display pixel comprises a plasmonic resonator structure for color filtering via optical resonance. The plasmonic resonator structure comprises an electrically conductive metal grating structure and an active material, such as a photoactive material or a dielectric material. The electrically conductive metal grating structure comprises at least two openings capable of transmitting a portion of an electromagnetic spectrum generated by the display device. The electromagnetic waves can transmit through the two or more openings to generate a filtered and polarized output having a predetermined range of wavelengths via optical resonance. In certain variations, such a display device is a liquid crystal display (LCD) device. The resonator structure can serve as a transparent conductive electrode and a polarizer in a pixel for such an LCD display.

In certain variations, a novel reflective colored display is provided that is viewable under direct sunlight and can simultaneously harvest incident light to generate photocurrent and thus electrical power. Moreover, a plasmonic optical spectrum filtering device comprising a resonator structure, such as a thin film stack based color filter platform, is disclosed, which can be designed to either function as a transmission color filter with efficiency twice that of conventional colorant based color filter; or as a reflective color filter as will be used in the proposed energy harvesting reflective display.

In yet other variations, a method of spectrum filtering is provided that comprises filtering an electromagnetic spectrum by optical resonance of a plasmonic resonator structure. The resonator structure comprises an electrically conductive metal grating structure and an active material selected from a dielectric material or a photoactive material. The resonator structure can thus generate a filtered output having a predetermined range of wavelengths. In accordance with certain principles of the present teachings, a periodicity of the electrically conductive grating structure relates to the predetermined range of wavelength(s) that is transmitted. For example, in certain embodiments, the predetermined range of wavelengths of the filtered output is in the visible light range and has a color selected from the group consisting of: cyan, yellow, magenta, red, green, blue, and combinations thereof.

Furthermore, the present disclosure also provides in various aspects, methods of making plasmonic optical spectrum filtering devices. Such methods include forming a resonator structure comprising an electrically conductive metal nanograting subwavelength structure and an active material selected from a dielectric material or a photoactive material via a process selected from UV photolithography, nanoimprint lithography, focused ion beam processing, stamping or metal transfer printing. In this manner, the electrically conductive metal nanograting subwavelength structure is formed that comprises at least two openings capable of transmitting a portion of an electromagnetic spectrum there through to generate a filtered output having a predetermined range of wavelengths via optical resonance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A shows reflection spectra for red, green, blue (RGB) based on preliminary design and simulation of a reflective filtering device like that of FIG. 4, while FIG. 5B shows absorption for such a device.

Figures 6A, 6B, 6C:
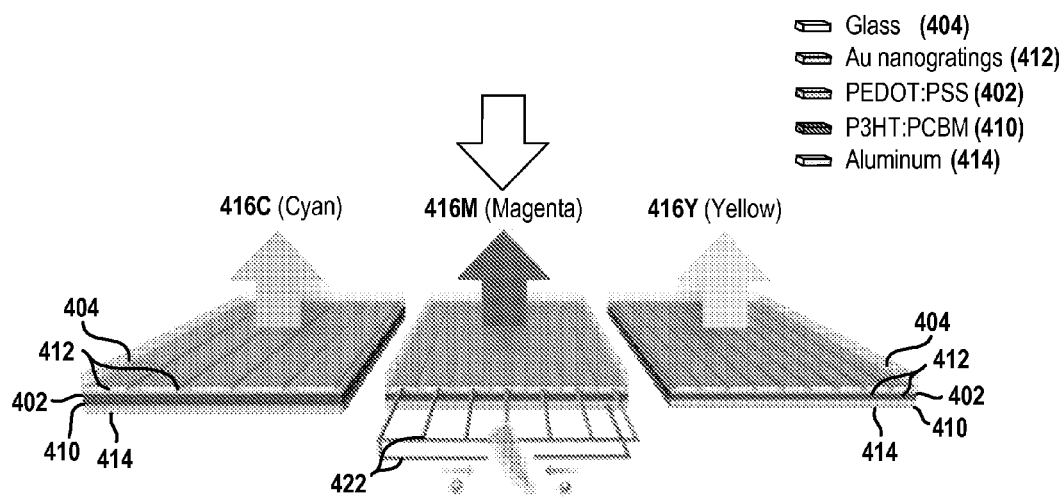
Figures 6D, 6E, 6F:
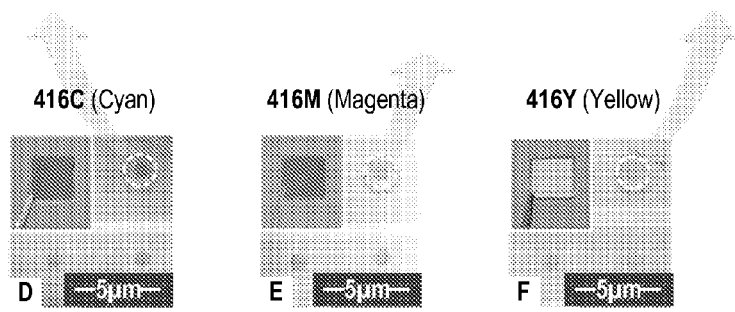
Figures 6G, 6H, 6I:
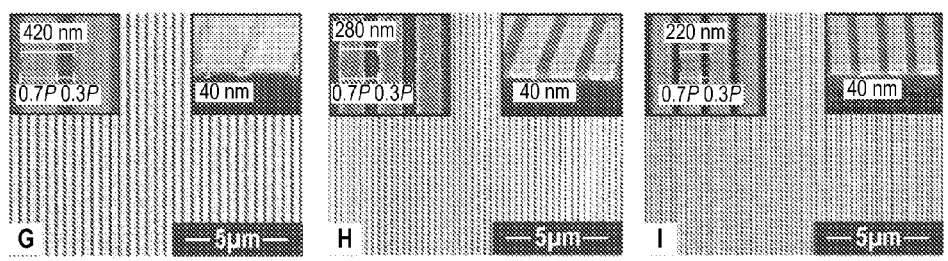

FIGS. 6A-6I are energy-generating photonic color filters. FIGS. 6A-6C is a schematic of dual-function devices. In all three cases, the thickness of Au nanogratings and PEDOT:PSS layer are 40 nm and 30 nm respectively. Au nanogratings have 0.7 duty cycle (Au line width is 0.7 of the period). The photovoltaic property with an external current collector is schematically described in FIG. 6B as a representative. FIG. 6A is a cyan colored device having 420 nm period Au nanogratings and 90 nm thickness P3HT:PCBM photoactive layer. FIG. 6B is a magenta colored device having 280 nm period Au nanogratings and 65 nm thickness photoactive layer. FIG. 6C is a yellow colored device having 220 nm period Au nanogratings and 50 nm thickness photoactive layer. FIGS. 6D-6F are photographs of dual-function devices having 1 mm diameter circular shape. The inset images are the large area version having about 1 cm size; FIG. 6D is cyan, FIG. 6E is magenta, and FIG. 6F is yellow. FIGS. 6G-6I are scanning electron microscope (SEM) images of Au nanogratings. The left and right inset images are the high magnification top and tilted views, respectively. The "P" in the left inset image represents the period of Au nanogratings. FIG. 6G is a 420 nm period, FIG. 6H is a 280 nm period, FIG. 6I is a 220 nm period.

Figure 7A:
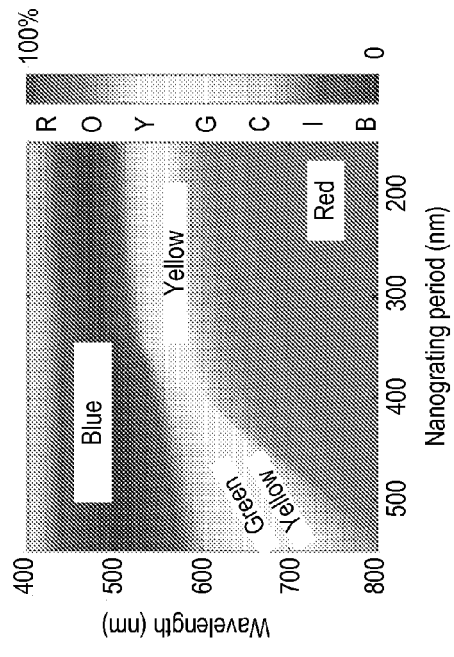
Figure 7B:
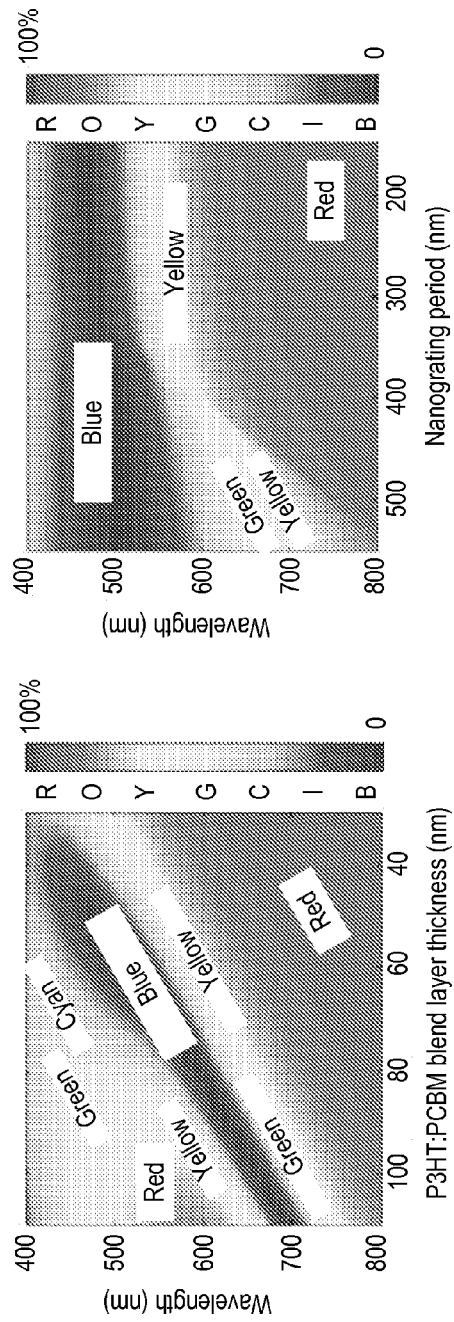
Figure 7C:
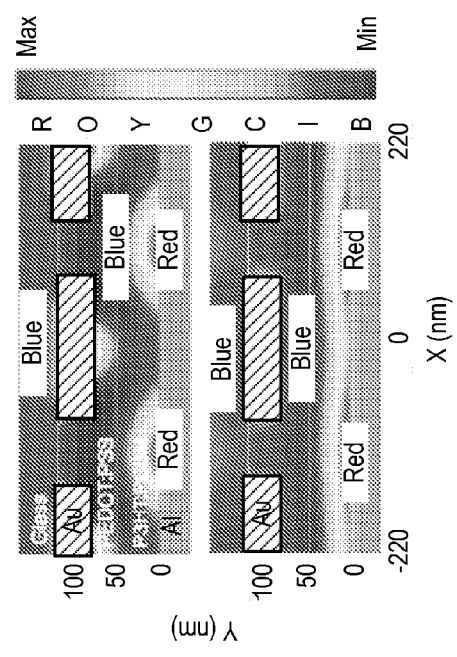
Figure 7D:
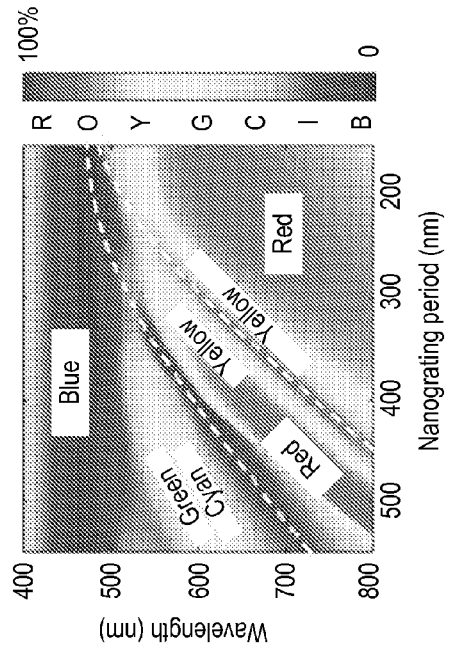

FIGS. 7A-7D are calculated maps of the reflection for the proposed structures. The thickness of Au nanogratings and PEDOT:PSS layer are fixed at 40 nm and 30 nm, respectively. Au nanogratings have 0.7 duty cycle. FIGS. 7A-7B is a reflection for transverse electric (TE) polarized light waves as a function of the thickness of P3HT:PCBM blend photoactive layer (Au nanograting period is fixed at 280 nm) (FIG. 7A) and Au nanograting period (the thickness of photoactive layer is fixed at 50 nm) (FIG. 7B). FIG. 7C is a reflection for transverse magnetic (TM) polarized light waves as a function of Au nanograting period (the thickness of photoactive layer is fixed at 50 nm). FIG. 7D is a magnetic field intensity distribution for TM (top) and TE (bottom) waves at the same resonant absorption wavelength of 490 nm. The thickness of photoactive layer and the period of Au nanogratings are 50 nm and 220 nm, respectively.

FIGS. 8A-8F are color filtering behaviors in dual-function devices. FIGS. 8A-8C are the reflection spectra calculated by Rigorous Coupled Wave Analysis (RCWA) simulation. The solid line, dashed line, and dotted line represent unpolarized condition, TM mode, and TE mode, respectively; FIG. 8A is cyan, FIG. 8B is magenta, and FIG. 8C is yellow. FIGS. 8D-8F are measured reflection spectra. Open circle, half-down open circle, and half-up open circle represent unpolarized condition, TM mode, and TE mode, respectively; FIG. 8D is cyan, FIG. 8E is magenta, and FIG. 8F is yellow.

Figure 9:
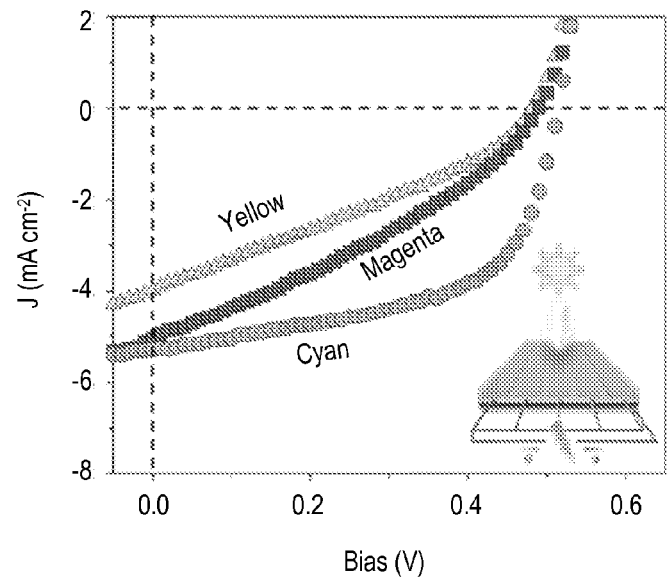

FIG. 9 shows photovoltaic behaviors in dual-function devices. Circle, square, and triangle symbols represent the devices showing cyan, magenta and yellow colors, respectively. J-V plots of dual function devices. All data were measured at AM 1.5 G with an intensity of 100 mW cm$^{-2}$. Average solar cell characteristics such as short circuit current density (Jsc), open circuit voltage (Voc), fill factor (FF) and power conversion efficiency (PCE) are summarized as follows: cyan (Jsc=5.28 mA cm$^{-2}$, Voc=0.51 V, FF=57.5%, PCE=1.55%); magenta (Jsc=5.04 mA cm$^{-2}$, Voc=0.49 V, FF=33.1%, PCE=0.82%); yellow (Jsc=3.98 mA cm$^{-2}$, Voc=0.48 V, FF=31.2%, PCE=0.60%). The inset image is a schematic of dual-function device having a photovoltaic function.

Figure 10A:
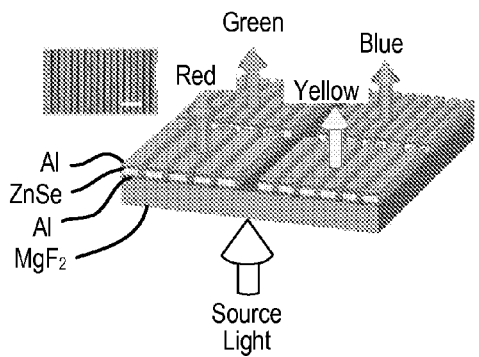
Figure 10B:
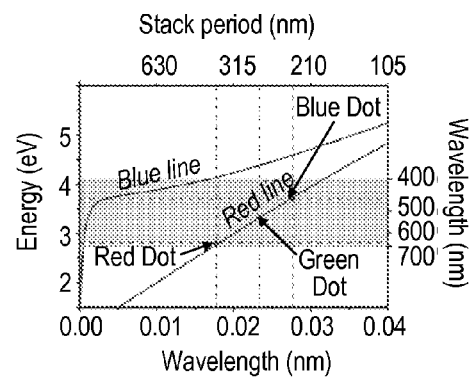
Figure 10C:
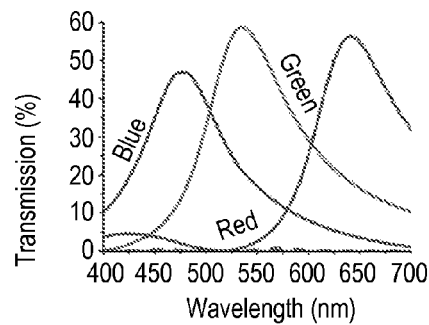
Figure 10D:
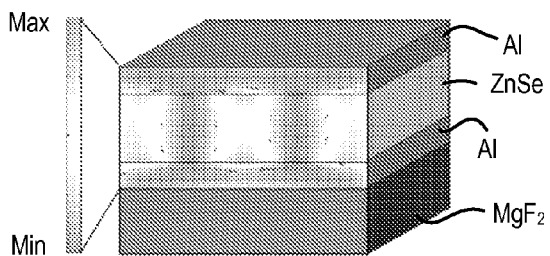

FIGS. 10A-10D are plasmonic nanoresonators formed by a resonator structure having metal-insulator-metal (MIM) stack arrays. FIG. 10A is a schematic diagram of an exemplary embodiment of such an inventive plasmonic nanoresonator. The white arrow represents a source of incident white light and red, yellow, green and blue arrows represent filtered output of transmitted colored light from the different stack arrays. The MIM resonator structure includes aluminum, zinc selenide and magnesium fluoride materials, respectively. An inset is the scanning electron microscopy image of the fabricated device. Scale bar, 1 µm. FIG. 10B shows plasmon dispersions in the MIM stack array. Red, green and blue dots correspond to the case of filtering primary RGB colors. Red and blue lines/curves correspond to antisymmetric and symmetric modes respectively. A shaded region indicates the visible range. FIG. 10C is simulated transmission spectra for the RGB filters. The solid and dash curves correspond to TM and TE illuminations respectively. The stack period for RGB filters is 360, 270 and 230 nm. FIG. 10D is a cross-section of the time-average magnetic field intensity and electric displacement distribution (red arrow) inside the MIM stack at a wavelength of 650 nm with 360 nm stack period. On the right side of FIG. 10D constitutive materials are indicated, in the same configuration as in FIG. 10A.

Figure 11:
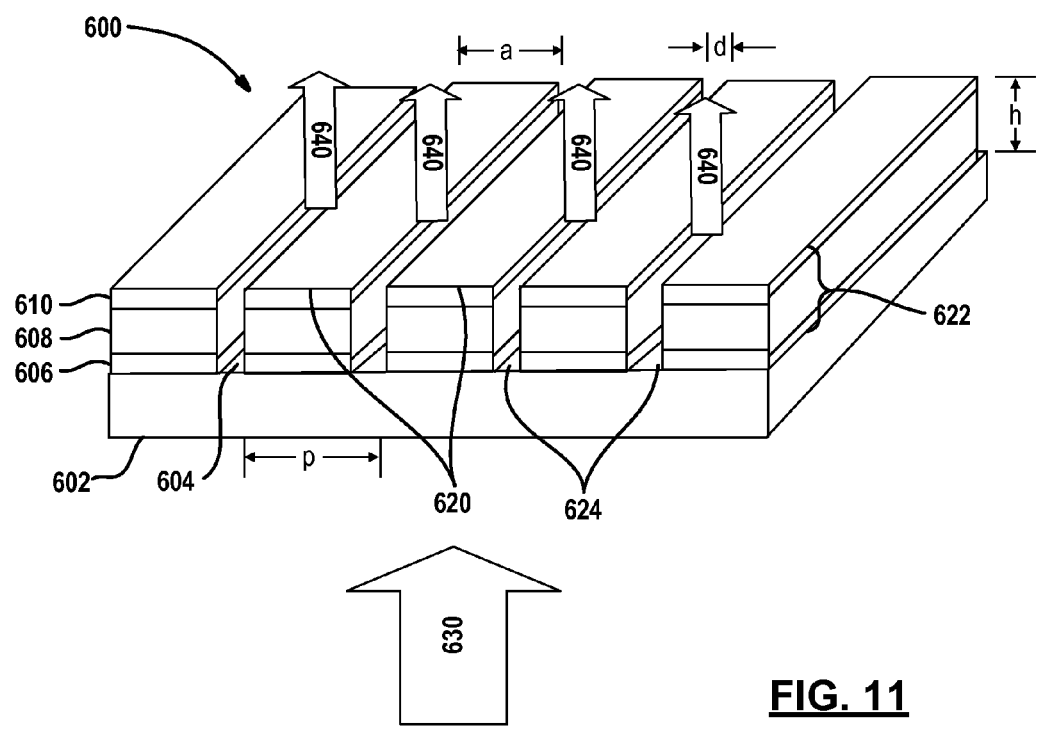

FIG. 11 is a schematic diagram of another exemplary embodiment of an inventive plasmonic nanoresonator filter device comprising a stack array of metal-insulator-metal (MIM) thin films, which generates filtered light.

FIGS. 12A-12D are plasmonic color filters. FIG. 12A is optical microscopy images of seven plasmonic color filters illuminated by white light. Scale bar, 10 μm. FIG. 12B is experimentally measured transmission spectra of three fabricated color filters corresponding to the RGB colors. The circle and triangle correspond to TM and TE illuminations respectively. FIG. 12C is scanning electron microscopy image of the pattern "M" formed by two stack periods. The periods of the navy blue background and the yellow character are 220 and 310 nm, respectively. Scale bar, 3 μm. FIG. 12D is an optical microscopy image of the pattern illuminated with white light.

FIG. 13 is a simulated transmission for green and red filters prepared according to the present teachings having 2, 4, 6, and an infinite number of openings or slits. The circle, triangle, diamond and star correspond to the structure with 2, 4, 6 and infinite slits respectively. An inset shows the optical microscopy images for the case of 2, 4 and 6 slits (slit number increases from bottom to top).

FIGS. 14A-14D are plasmonic spectroscopes for spectral imaging prepared in accordance with certain aspects of the present teachings. FIG. 14A is a scanning electron microscopy (SEM) image of the fabricated 1D plasmonic spectroscope with gradually changing periods from 400 to 200 nm (from left to right). Scale bar, 21 μm. FIG. 14B is an optical microscopy image of the plasmonic spectroscope illuminated with white light, showing a spectrum of filtered colors ranging from red to blue. FIG. 14C is an SEM image of a two-dimensional plasmonic resonator having a spoke structure prepared in accordance with the certain aspects of the present teachings. Scale bar, 31 μm. FIG. 14D includes optical microscopy images of the spoke structure of FIG. 14C illuminated with unpolarized light (center) and polarized light (four boxes), showing a spectrum of filtered colors (including blue "B," cyan "C," green "G," yellow "Y," and red "R") from different angles.

Figure 15A:
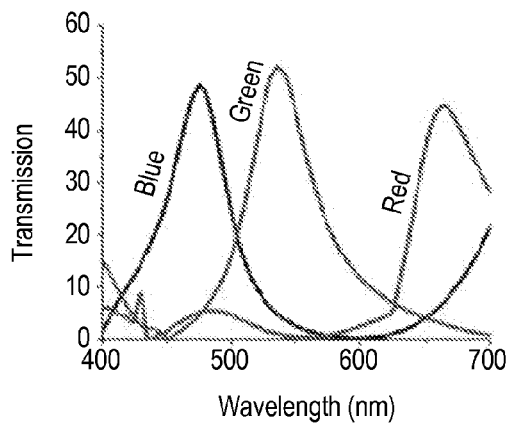
Figure 15B:
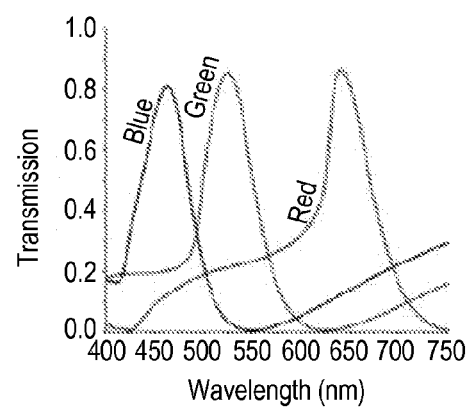
Figure 15C:
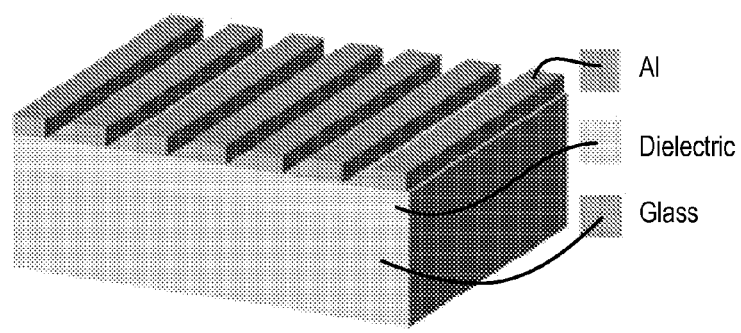

FIGS. 15A-15C are TM transmission simulation results for certain plasmonic resonator filter embodiments according to the present teachings, which includes a polarizing structure including a thick aluminum grating and a high refractive index dielectric material (FIG. 15A), and a thin aluminum grating, lower refractive index dielectric material as a high transmission structure (FIG. 15B). FIG. 15C is a schematic of an exemplary corresponding plasmonic resonator filter structure.

Figure 16A:
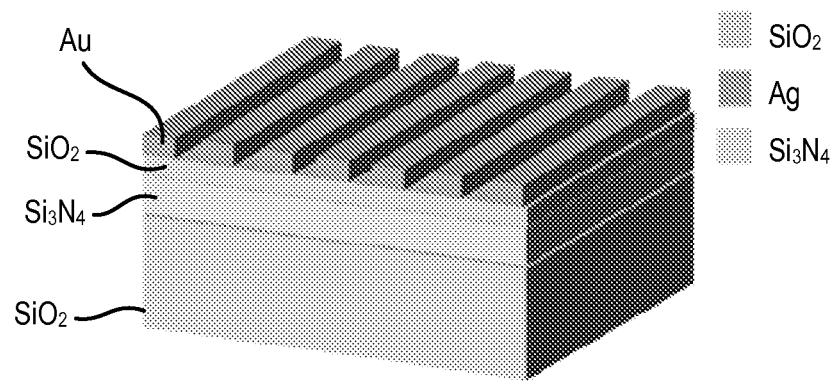
Figure 16B:
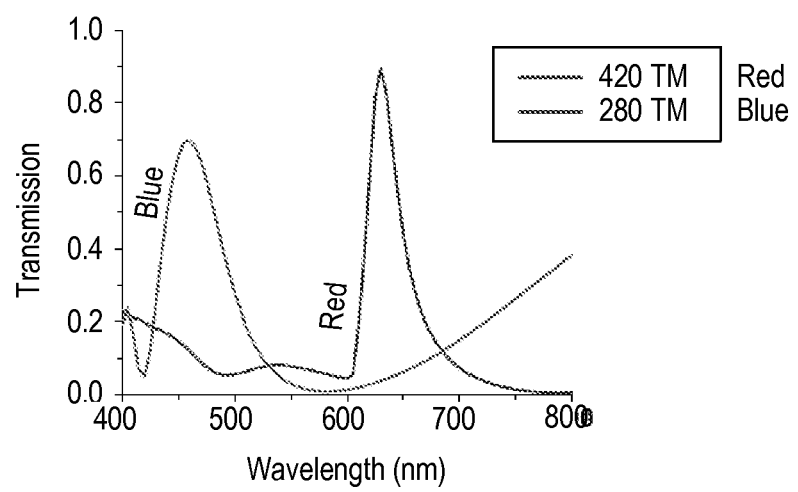

FIGS. 16A-16B include a schematic of an alternative embodiment according to certain aspects of the present teachings, including a resonator structure that contains a low refractive index spacer layer of silicon dioxide between a metal grating comprising gold and a high refractive index dielectric material guiding layer ($Si_3N_4$). FIG. 16B is experimental TM transmission result obtained for such a structure with two different metal grating periods.

Figure 17A:
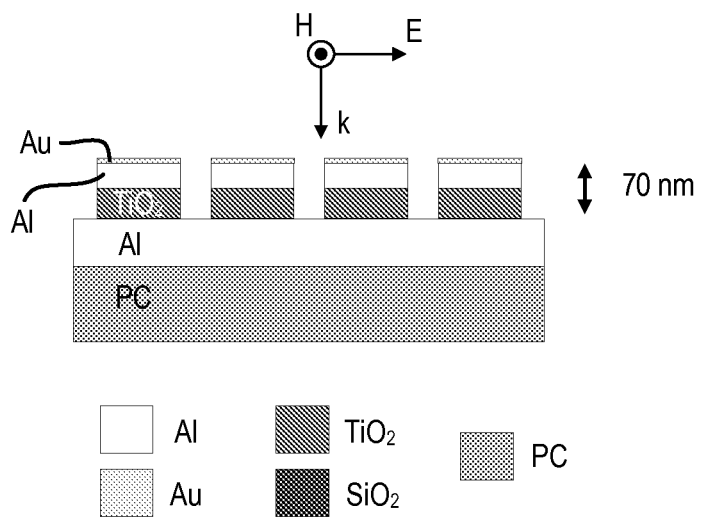
Figure 17B:
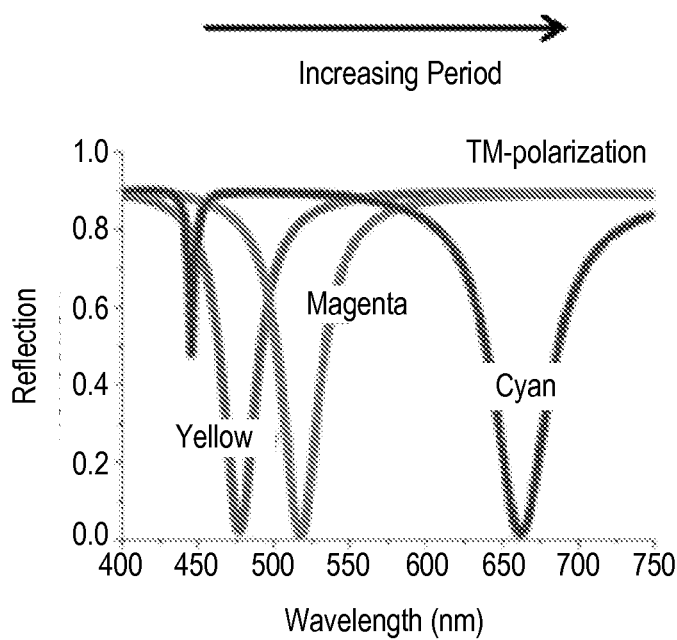

FIGS. 17A-17B. FIG. 17A is a schematic of an embodiment of a reflective color filter structure according to certain aspects of the present disclosure. FIG. 17B shows reflection spectra for the structure of FIG. 17A having varying periods under TM polarized illumination.

FIGS. 18A-18D is a schematic of a method of fabricating an exemplary plasmonic resonator structure according to certain aspects of the present teachings via a pattern transfer process. FIG. 18A shows a surfactant coated silicon dioxide ($SiO_2$) mold. FIG. 18B shows an evaporation process of thin film metal layers (gold (Au), followed by aluminum (Al), then titanium dioxide ($TiO_2$)) followed by sputtering of thick and continuous aluminum (Al). FIG. 18C shows press molding into a polycarbonate (PC) substrate with application of temperature/pressure. FIG. 18D is shows a detached PC sample separated from the $SiO_2$ mold.

FIGS. 19A-19B is an SEM image of yellow reflective filter structure with 220 nm period.

Figure 20A:
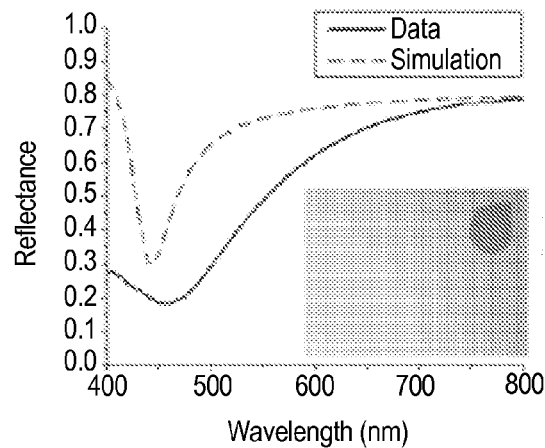
Figure 20B:
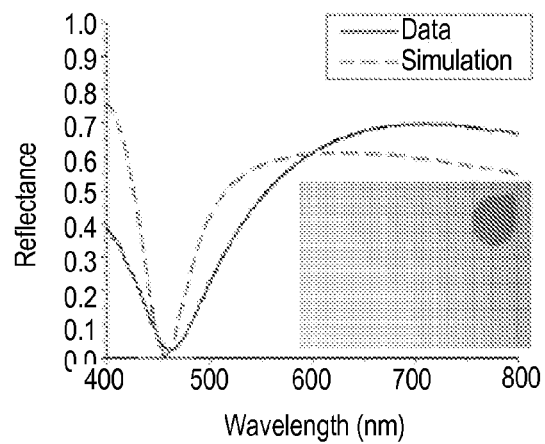
Figure 20C:
Figure 20D:
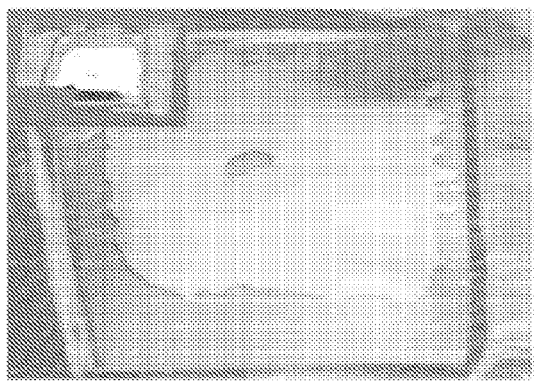

FIGS. 20A-20D. FIG. 20A is a TE simulation and FIG. 20B is a TM simulation (red, dashed) and data (black, solid) for yellow reflective filter structure prepared in accordance with certain aspects of the present disclosure having a 220 nm period along with microscope images of respective polarizations. FIG. 20C is a picture of a front of the final transferred structure on PC. The back looks like a flat Al film while the front shows a distinct yellow color. The drop-shaped object is a region on the sample without the top Al grating, which provides a polarization independent reference for the optical images.

Figure 21A:
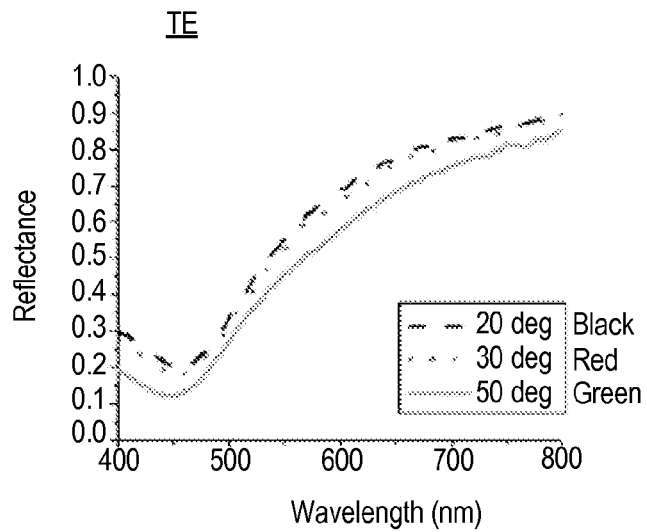
Figure 21B:
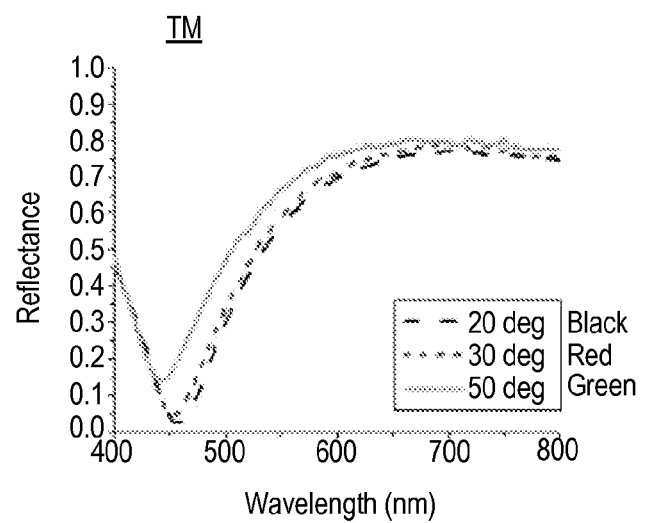
Figure 21C:
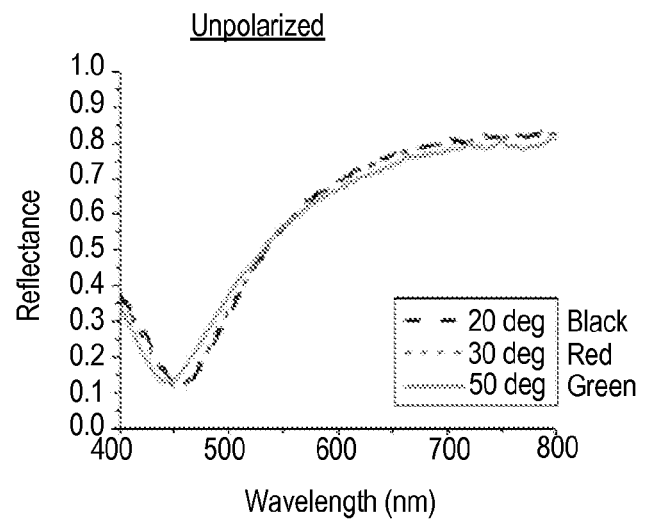

FIGS. 21A-21C are graphs showing angular dependence of TE (FIG. 21A), TM (FIG. 21B), and unpolarized reflectance spectra of yellow filter (FIG. 21C). The angle between the source and detector varies from 20° to 50°.

Figures 22, 23:
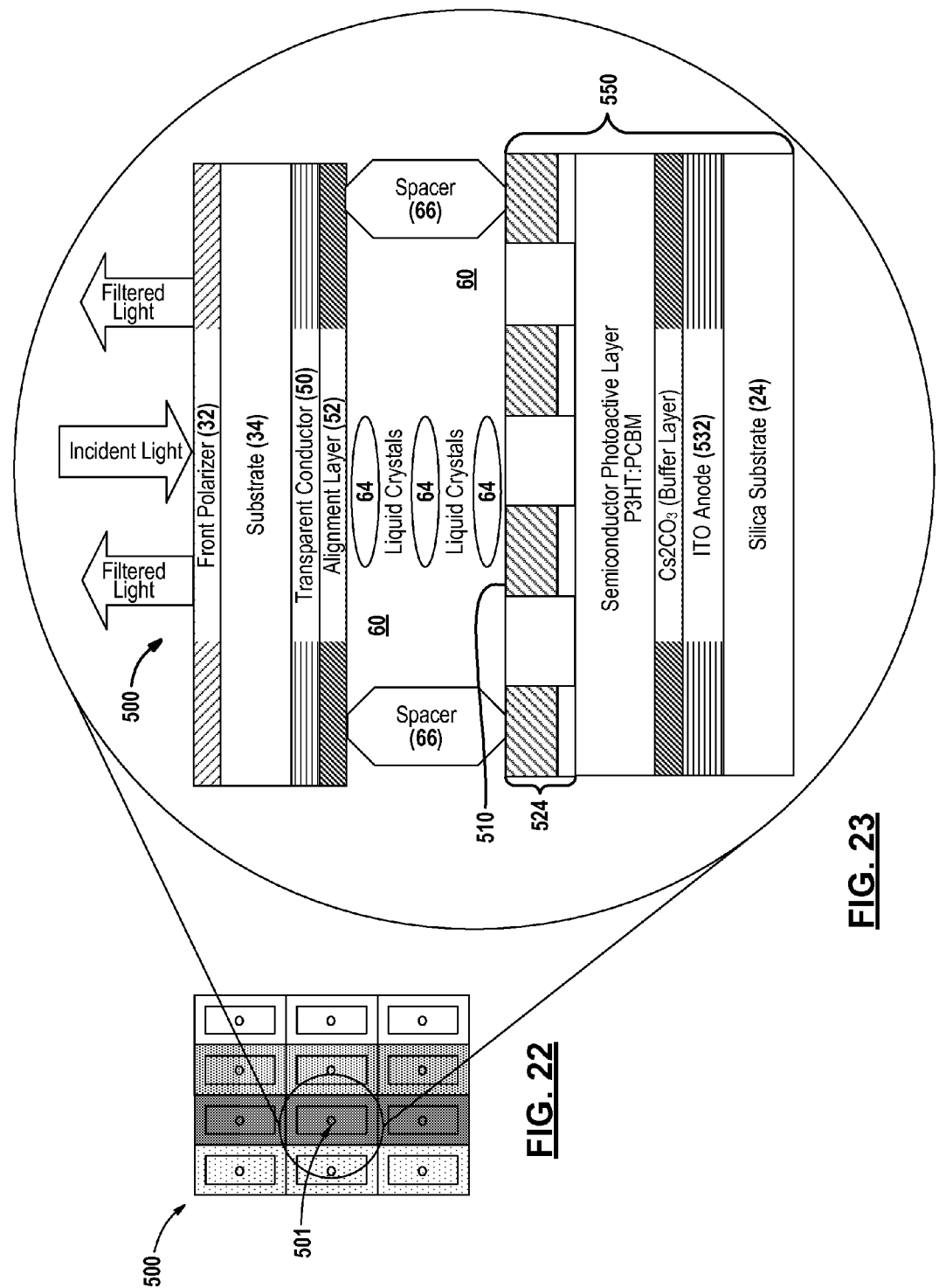

FIG. 22 is a pixel array for a liquid crystal display panel;

FIG. 23 is a cross-sectional detailed view of an exemplary pixel from FIG. 22 where a liquid crystal control layer is disposed over on top of an inventive optical plasmonic resonator reflective color filter and polarizer device that produces a colored pixel with on/off control in accordance with certain aspects of the present teachings.

Figure 24:
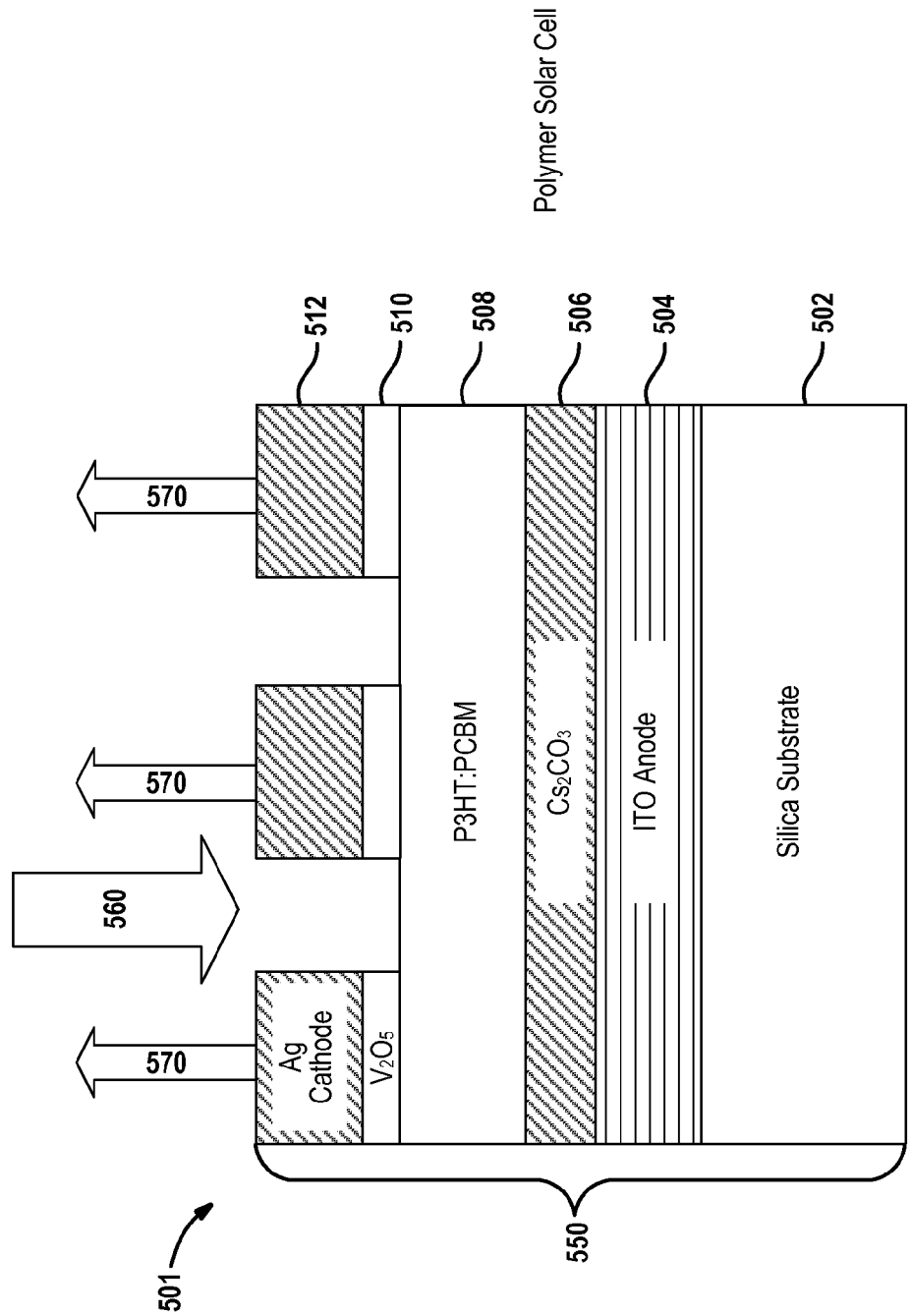

FIG. 24 is a sectional view of an exemplary inventive optical plasmonic resonator reflective color filter prepared in accordance with certain aspects of the present teachings that can be used in a liquid crystal display pixel of FIGS. 22 and 23.

Figure 25A:
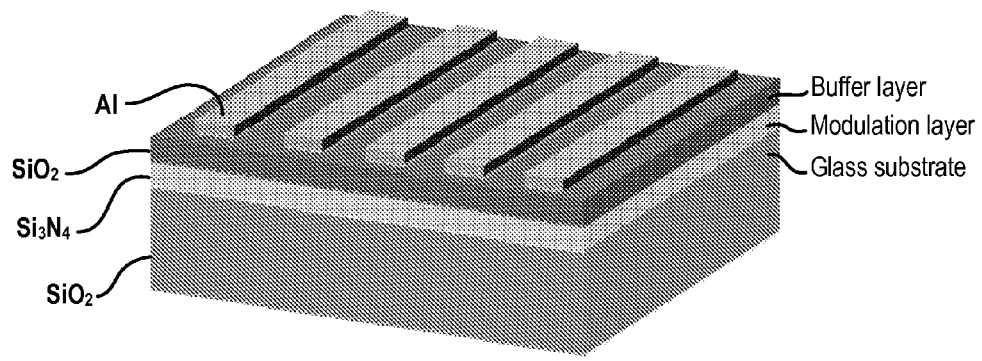
Figure 25B:
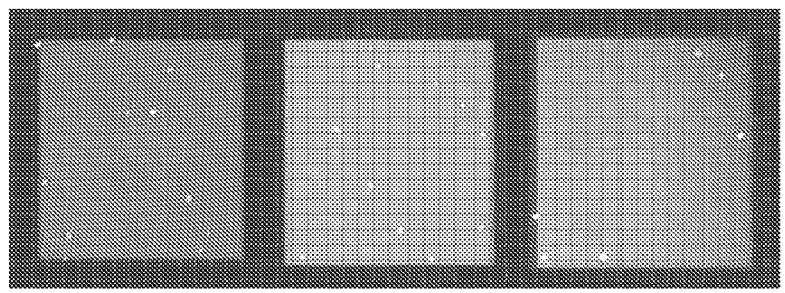
Figure 25C:
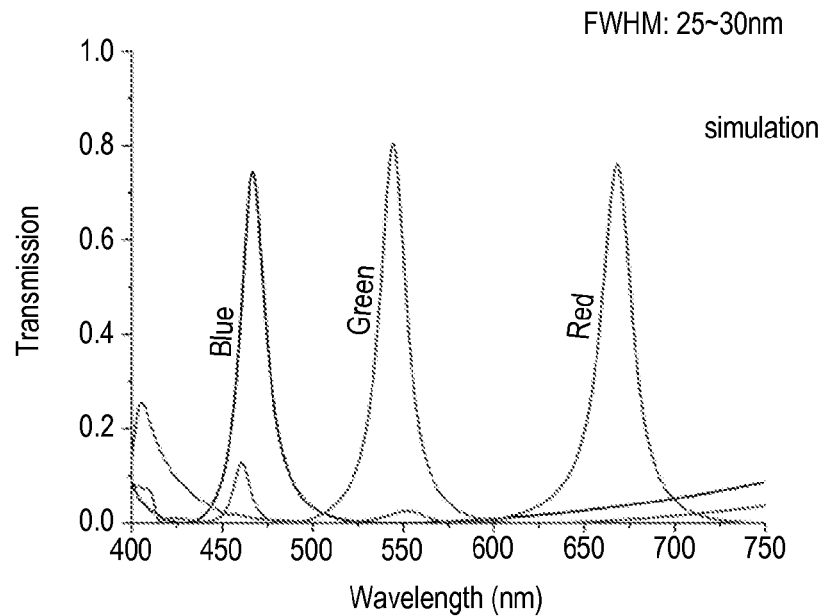
Figure 25D:
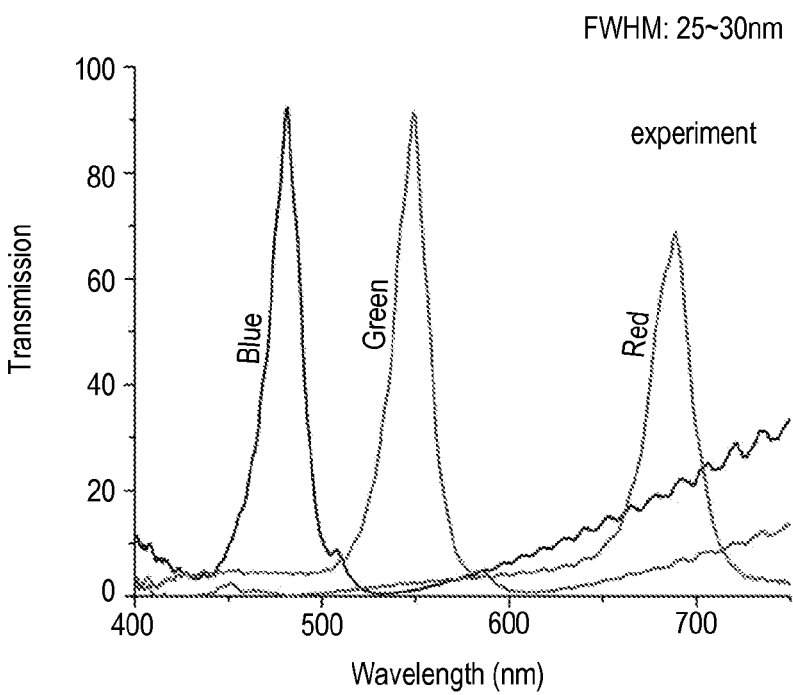

FIGS. 25A-25D show a high efficiency narrow band optical plasmonic resonator color filter having a buffer layer, a modulation layer, and a subwavelength grating having varying periods between grating rows (either 300 nm, 350 nm, or 450 nm) prepared in accordance with certain principles of the present disclosure (sectional view of design in FIG. 25A). FIG. 25B shows sectional views of filtered output from such a device, demonstrating the ability to filter blue, green, and red based on different periods of the grating structure. FIG. 25C shows a simulation of wavelength versus transmission for the three colors and FIG. 25D shows experimental data of wavelength versus transmission for comparison, where full width at half maximum (FWHM) is about 25-30 nm.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Example embodiments will now be described more fully with reference to the accompanying drawings.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

According to the present disclosure, a novel spectrum filtering device is provided. "Spectrum filtering" broadly encompasses filtering of any wavelength range of electromagnetic radiation, while color filtering refers to filtering within the visible light portion of the electromagnetic spectrum. Spectrum filtering is used interchangeably herein with the term "color filtering." In various aspects, an optical spectrum filtering device is provided that comprises a thin film stack arranged to form a resonator structure. Such a resonator structure according to certain aspects of the present teachings can be designed to either function as a transmission color filter with efficiency twice that of conventional colorant-based color filters; or as a reflective color filter, which can be used in conjunction with an energy harvesting reflective display. For example, one embodiment is a plasmonic optical spectrum filtering device for use as a color filter that comprises a resonator structure. Thus, the resonator structure comprises an electrically conductive metal grating structure and an active material, such as a dielectric material, a photoactive material, or combinations thereof. In certain embodiments, the resonator structure may include a metal-dielectric-metal stack. The electrically conductive metal grating structure comprises at least two openings (e.g., spaces between rows of material, for example) capable of transmitting a portion of an electromagnetic spectrum to generate a filtered output having a predetermined range of wavelengths via optical resonance.

According to the certain aspects of the present teachings, a device comprising a metal-dielectric-metal resonator structure (also referred to herein as a metal-insulator-metal or "MIM") is provided for a spectrum filtering function (e.g., color filtering) for both transmission and reflection type filters. In various aspects, the device has a sub-wavelength periodic structure that can efficiently couple the incident light into specific plasmon modes of the MIM stack and then scatter them to the far field. The term "sub-wavelength" is generally used to describe one or more dimensions smaller than a length of the wave that the device interacts with (for example, a sub-wavelength grating means a grating structure having openings for transmission with one or more dimensions that are less than a wavelength(s) of light interacting with it). By tuning a periodicity of the grating structure/resonator (e.g., a stack period or a period defined between openings) and a dielectric layer thickness, transmission or reflection peaks can be tuned to cover the visible wavelength range.

In certain aspects, the present teachings provide an optical spectrum filtering device capable of transmitting a portion of an electromagnetic spectrum to generate a filtered output having a predetermined range of wavelengths that exits the filter assembly. Both transmission and reflection spectrum or color filtering can be achieved. Thus, in certain variations, the optical spectrum filtering device may be a transmission-type filter, while in other variations; the optical spectrum filtering device may be a reflection-type filter. In yet other variations, the optical spectrum filtering device concurrently exhibits both a transmission and reflection type filter.

By way of background, in recent years, surface plasmons (SPs) and related plasmonic nano-structures have generated considerable interest with the development of nanofabrication and characterization techniques. SPs are essentially charge density waves generated by the coupling of light to the collective oscillation of electrons on the metal surface. By exploiting plasmonic nanostructures, such as nanohole or nanoslit arrays, efficient conversion between photons and plasmons can be controlled at sub-wavelength scale, which provides new solutions to traditional optical processes, such as color filtering and spectral imaging.

Recently, such effects have been reported using a metallic nanohole array to filter color by tuning the resonant transmission peak (filtered output) at the visible range. However, the transmission passbands of such filters are relatively broad and do not satisfy the requirements for multiband spectral imaging. Other attempts, such as nanoslits combined with period grooves or inserted into a metal-insulator-metal (MIM) waveguide also show color filtering effect. However, in these structures, two neighboring output openings or slits must be separated by additional structures or by specific coupling distances (both about several micrometers, causing attenuation due to metal absorption loss); therefore, the device dimension and efficiency are restricted. Moreover, because of the thick metal film used in these structures, the absorption loss from light entering and leaving the MIM waveguide further decreases the devices' efficiencies to generally less than 10%. Such an efficiency value is generally considered to be inadequate and does not satisfy the requirement for practical display applications.

MIM waveguide geometries offer the ability to support SP modes at visible wavelengths and are useful in a variety of different applications, such as guiding waves at sub-wavelength scale, concentrating light to enhance the absorption for photovoltaic applications, providing a near-field plate for superfocusing at optical frequency or composing metamaterials for strong magnetic resonance and negative refraction. Besides enabling efficient subwavelength confinement of spatial modes, compared with other nanostructures, the top and bottom metal layers of MIM waveguides can be integrated as electrodes in a straightforward manner in the electro-optic system, both of which minimize overall device size.

In certain aspects, the present disclosure pertains to improved spectrum filtering devices generated by using MIM waveguide resonators or other plasmonic resonator structures based on similar behavior. For example, in certain variations, the present teachings pertain to plasmonic MIM nanoresonator structures capable of filtering white light into individual colors (wavelengths or ranges of wavelengths) across the entire visible light band of the electromagnetic spectrum. Furthermore, the principles of the present disclosure can also be applied to other wavelength ranges.

In this context, surface plasmon-based nanostructures are attractive due to their small dimensions and the ability to efficiently manipulate light. In certain aspects, a method for plasmonic optical spectrum filtering is provided, which comprises filtering an electromagnetic spectrum by optical resonance of a plasmonic resonator structure comprising an electrically conductive metal grating structure adjacent to a dielectric material to generate a filtered output having a predetermined range of wavelengths. In certain aspects, the metal grating structure is a subwavelength grating (with respect to the filtered output, for example) that forms a nanoresonator. In accordance with certain aspects of the present technology, optical resonance includes selective conversion between free-space waves and spatially confined modes in plasmonic nanoresonators including subwavelength grating (e.g., in metal-insulator-metal stack arrays) to provide well controlled transmission spectra through such arrays by using relatively simple design rules. Accordingly, the inventive technology pertains to improved spectrum filtering devices generated by using nanoresonators to realize the photon-plasmon-photon conversion efficiently at specific resonance wavelengths. The present teachings provide high-efficiency spectrum or color filters capable of transmitting arbitrary colors. These artificial nanostructures provide an approach for high spatial resolution color filtering and spectral imaging with extremely compact device architectures.

Thus, in various aspects, the present teachings provide an optical spectrum filtering device that comprises a filter assembly comprising a first electrically conductive metal grating structure. By "grating structure" it is meant that the metallic material forming the structure comprises one or more openings there through to permit certain wavelength(s) of light to pass through. For example, in certain preferred aspects, a grating structure may comprise a plurality of metal rows or discrete regions spaced apart, but substantially parallel to one another. The spacing between adjacent rows defines a plurality of openings through which certain wavelengths of light may pass. The grating may also comprise a second plurality of metal rows having a distinct orientation from the first plurality of rows that are likewise spaced apart, but substantially parallel to one another. The first and second plurality of metal rows may intersect or contact one another at one or more locations to form a grid structure. It should be noted that in preferred aspects, the grating comprises at least two rows to form at least two openings, but that the number of rows and layers of distinct grating structures are not limited to only two, but rather may comprise multiple different designs and layers. Further, as described below, while the adjacent metal rows or other regions of the plurality are preferably distanced at a sub-wavelength distance from one another (a distance of less than the target wavelength or range of wavelengths), each respective pair of rows may define a distinct distance for each opening (or slit diameter) there between and thus will permit different wavelengths of light to travel there through. As discussed in greater detail below, a period between a pair of metal rows determines periodicity of the openings or slits in the grating structure, which relates to a wavelength (or range of wavelengths) generated by the filtering device. In certain variations, a periodicity defined by at least two openings of an electrically conductive grating structure determines a predetermined range of wavelengths that is transmitted in a transmission-type filtering device or reflected in a reflection type filtering device. Thus, a periodicity of the openings in the grating structure relates to spacing of adjacent metal rows, which determines a range of wavelengths in the filtered output(s) or color(s).

Plasmonic optical spectrum filtering devices having high peak transmission and high efficiency of a thin-film color filter are of primary interest. Depending on the specific applications, in certain technologies, simultaneous polarization of the transmitted light is desirable, while others applications may require narrow spectral peaks for highly specific wavelength filtering.

In certain aspects, a resonator structure comprises both a first electrically conductive metal grating structure and a second distinct electrically conductive metal grating structure. In certain embodiments, the first and second metal grating structures sandwich an active material, such as an insulator or dielectric material. The first and second grating structures can be arranged to have a complementary configuration where the gratings are substantially vertically aligned with one another (to commonly define the same openings). In certain embodiments, the arrangement of the first and second grating structures in conjunction with the presence of the dielectric material layer(s) forms a filter assembly that is capable of transmitting a portion of an electromagnetic spectrum through at least one opening defined between respective metal rows of the grating structures, optionally through at least two openings, to generate a filtered output having a predetermined range of wavelengths.

Figure 2:
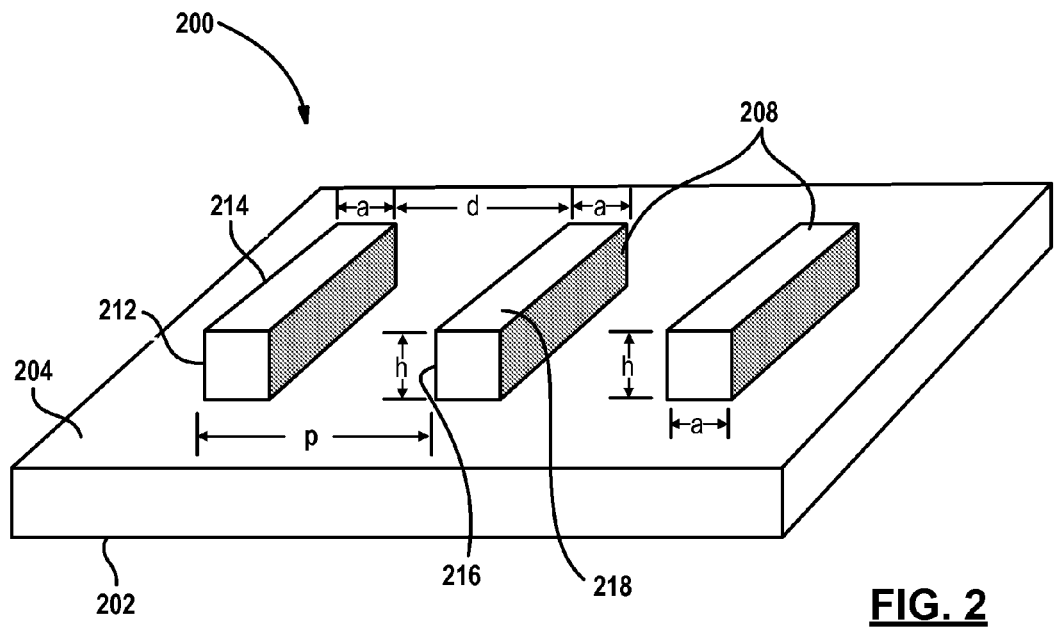
FIG. 2 is a schematic of a thin metal grating on a substrate used to create a plasmonic resonator filtering device in accordance with certain principles of the present disclosure.

In various aspects, the present disclosure provides methods of forming various micro-structural features with various sizes, orientations, shapes, and configurations, especially grating structures for the resonator stack. Various multilayer surfaces can be formed according to the present disclosure in a variety of patterns (not limited to exemplary layered structures discussed herein). In various aspects, the methods of the disclosure can be used to form wire grating resonators, electrodes, and/or polarizers, having at least one microscale and/or nanoscale feature (such as nano-grating that defines a multi-layer grating structure). Such grating nanostructures can have a variety of different shapes tailored to the end application; by way of example; a suitable wire grid polarizer has a period (i.e., interval/distance between a first feature and a second feature, see FIGS. 2 and 3, for example) of less than about 1 µm suitable for polarizing and/or filtering electromagnetic energy waves in the visible (wavelength ranging from about 400 nm to about 800 nm) to near-IR (wavelengths ranging from about 1 µm to about 10 µm). As noted above, in various aspects, subwavelength grating structures are particularly desirable for the inventive plasmonic resonator devices, which means that one or more of the grating dimensions is smaller than a wavelength or range of wavelengths that are filtered by the device (e.g., a sub-wavelength grating means a grating structure for filtering visible light having one or more dimensions that are less than a wavelength of 1 µm, preferably less than about 600 nm, depending on the particular wavelength of a color to be generated). As described in certain embodiments below, wire grid structures according to the present teachings in the form of subwavelength metallic gratings are an attractive alternative to conventional polarizer filters, because they provide a high extinction ratio between the transmitted transverse magnetic (TM) polarized light and the reflected transverse electric (TE) polarized light over a wide wavelength range and incident angle with long-term stability.

The techniques described in this disclosure are generally applicable to a variety of display devices, including any flat panel display having either transmission or reflection type, especially for high input power application like a three-dimensional projection displays. Electromagnetic spectrum filters, such as color filters, are an important component for various display technologies, including flat panel displays, liquid crystal displays (LCD), projection displays (such as using digital mirror technology, or liquid crystal on silicon (LCoS), eye-wear displays, complementary metal-oxide-semiconductor (CMOS) image sensors, IR imagers, light emitting diodes, and the like. For example, transmissive optical spectrum filters are widely utilized in applications such as liquid crystal display (LCD) panels. The design of the thin film structure can significantly simplify the color filter, polarization and liquid crystal control used in current LCD displays, for example. Compared with the aforementioned color-filtering methods, the inventive design significantly improves absolute transmission, pass bandwidth and compactness. In addition, the filtered light is naturally polarized, making it particularly attractive for direct integration in liquid crystal displays (LCDs) without requiring a separate polarizer layer or filter.

Furthermore, in certain aspects of the present teachings, a method and a device are disclosed to increase the energy harvesting area of computing devices by integrating photovoltaic ("PV") functionality directly into the display. Hence according to certain variations of the present teachings, a novel reflective colored display is provided, which is viewable under direct sunlight and can concurrently harvest incident light and generate electrical power. Therefore, a method and apparatus are provided to increase the energy harvesting area of computing devices by integrating PV functionality directly into the display.

The present technology provides resonator structure, such as a metal-dielectric-metal structure, that realizes spectrum filtering function for both transmission and reflection types. By tuning the dielectric layer thickness and period of metallic grating structures, the transmission or reflection peak covers a range of predetermined wavelengths, such as the visible or near-infrared (near-IR) ranges. Particularly suitable visible and infrared electromagnetic radiation includes, visible light having wavelengths ranging from about 390 to about 750 nm and infrared radiation (IR) (including near infrared (NIR) ranging from about 0.75 to about 1.4 µm). Filtered electromagnetic radiation can have a wavelength in a range of about 625 nm to 740 nm for red; orange is at about 590 nm to about 625 nm; yellow is at about 565 nm to about 590 nm; green is at about 520 nm to about 565 nm; blue or cyan is at about 500 nm to about 520 nm; blue or indigo is at about 435 nm to about 500 nm; and violet is at about 380 nm to about 435 nm. Further, in certain aspects, the filtered light may be extra-spectral or a mixture of several different wavelengths. For example, magenta is an extra-spectral mixture of red (625 nm to 740 nm) and blue (435 nm to 500 nm) wavelengths.

Figure 1:
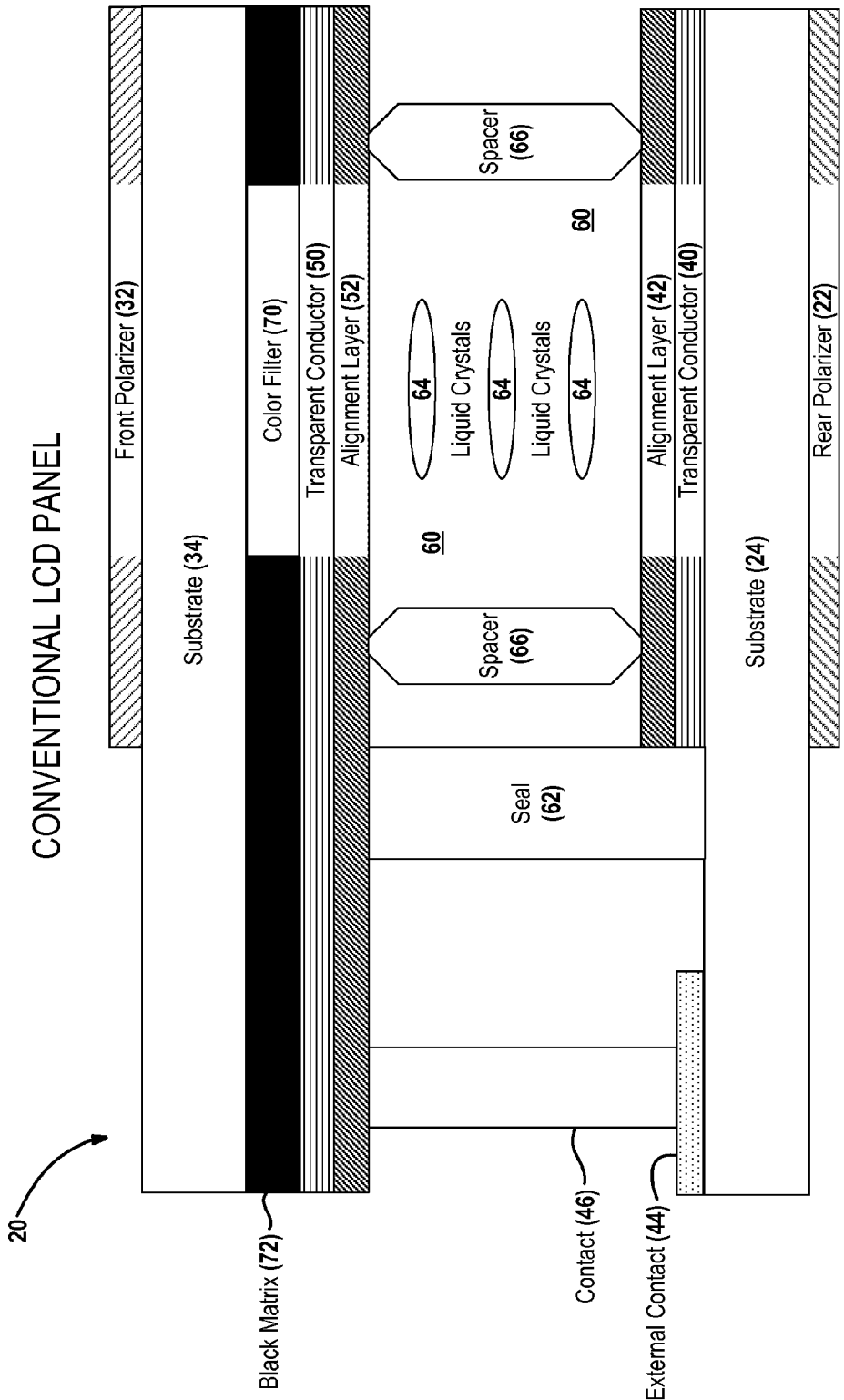
FIG. 1 shows a sectional schematic of a conventional liquid crystal display pixel.

Conventional optical filters using pigment dispersion to produce RGB colors are manufactured by four separate processes, which not only complicate the manufacturing but also waste many chemical materials in the process. In a conventional LCD display, separate liquid crystal (LC) alignment layers, polarizer sheets, and transparent electrodes are required. As background, an exemplary simplified conventional LCD panel display 20 is shown in FIG. 1. Along the lower bottom side, which receives light to be processed, a rear polarizer 22 is adjacent to a first transparent substrate 24 (e.g., a glass substrate), while along the upper top side a front polarizer 32 is adjacent to a second transparent substrate 34. On the bottom side, a transparent lower conductor 40 (or electrode) is disposed adjacent to a lower alignment layer 42 (having a surface morphology that induces a predetermined orientation of liquid crystals upon application of current thereto). The lower first substrate 24 also has an external electrical contact 44 and a contact bridge 46 that contacts an upper alignment layer 52.

A liquid crystal compartment (60) is formed by a seal 62 in contact with the first substrate 24 and the upper alignment layer 52 to contain a plurality of liquid crystals 64. Two spacers 66 are also disposed within the liquid crystal compartment 60 in contact with both the upper and lower alignment layers 42, 52. Adjacent to the upper alignment layer 52 is an upper transparent conductor (or electrode) 50. The upper and lower alignment layers 42, 52 have complementary surface morphologies that induce a preferred orientation for the liquid crystals 64 when voltage or electrical potential is applied to permit light to transmit and rotate through the liquid crystals. On the upper side of the LCD assembly 20 adjacent to the upper transparent conductor 50 is a color filter 70 disposed within a black absorptive matrix 72, which is adjacent to the upper substrate 34. Thus, when electrical potential is applied to the upper and lower conductors, the liquid crystals are oriented such that white light (generated within the display device) is permitted to pass through the rear polarizer 22, into the liquid crystals 64, through the color filter 70, which is then transmitted out of the front polarizer 32 to provide a filtered colored light. In the absence of electrical potential applied to the conductors/electrodes 30, 40, the liquid crystals 64 are randomly oriented and no incident light passes through the liquid crystal compartment. LCD pixels frequently have three adjacent color filter assemblies (tuned to provide one of a red-green-blue "RGB" color, for example) that can be selectively activated. Typical transmission efficiencies for such conventional LCD filtering devices are on the order of only about 6%, while the cost of such conventional color filter assembly accounts for about 20% of the total cost of an LCD panel.

In certain aspects, a first grating structure (e.g., grid or mesh pattern) is formed on a major surface of the substrate having a first orientation. In one example, such as that shown in FIGS. 2 and 3, a grating structure pattern 200 is formed over a substrate 202 having a major surface 204. The grating pattern may be formed of a conductive material, such as a thin metallic film. A plurality of substantially parallel rows 208 of such thin film conductive materials are formed on major surface 204. The plurality of rows 208 in the grating pattern 200 optionally comprise an electrically conductive metal, such as gold or aluminum. In certain variations, gold is a preferred electrically conductive metal for rows 208.

The grid or grating pattern 200 of metal rows formed on substrate 202 defines a period "p" (a distance defined from a first side 212 of a first row 214 to a first side 216 of a second adjacent row 218). A distance "d" between adjacent rows 208 is considered an opening (or aperture or slit) as described below. It should be noted that distance "d" may vary through the grating pattern 200 where d is represented by d=p−a. A metal row 208 has a height "h" and a width of each metal row 208 is "a." A duty cycle is defined by f=a/p. Periodicity refers to at least one period (p) between a pair of rows in the grating pattern, but where there are more than two openings typically to a repeating period (p) in the grating pattern. In one exemplary embodiment, the period (p) between rows 208 is about 700 nm, the width (a) of each row 208 is about 70 nm, and the height (h) of each metal row 208 is about 40 nm. Thus, a high transparency resonator structure can be designed by adjusting metal row width (a) and period (p) so that different wavelengths of light can be transmitted through openings (d). High conductance can likewise be achieved by adjusting the thickness (h) of the film of metal material forming rows 208. Such a grating pattern 200 provides a highly flexible design that can be readily tailored for different performance criteria.

Figure 3:
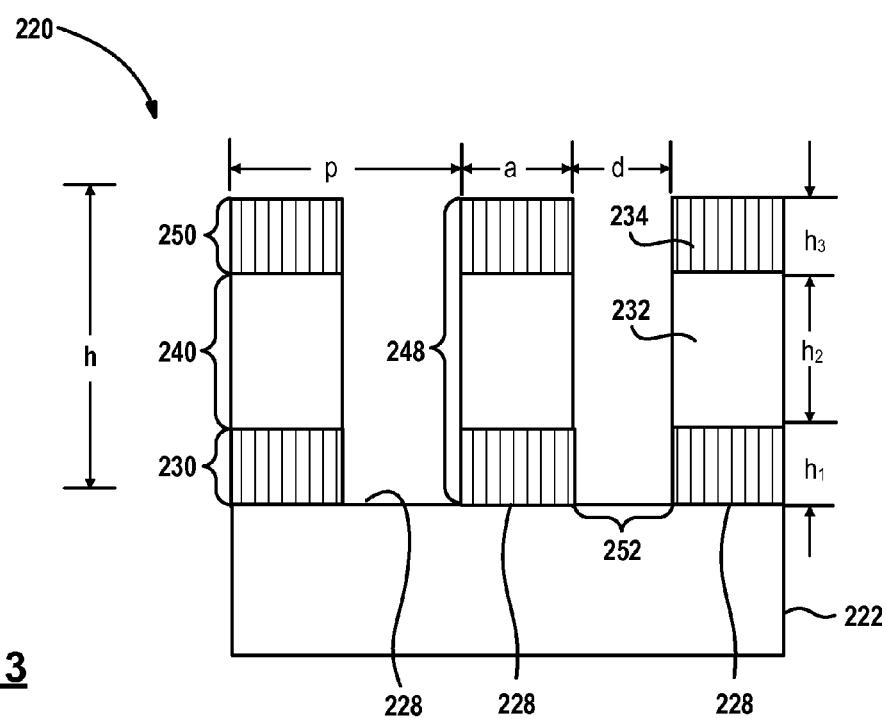
FIG. 3 is a sectional view of an exemplary inventive plasmonic resonator filtering device having a metal-insulator-metal (MIM) stack or array with sub-wavelength gratings formed in accordance with the present teachings.

As shown in FIG. 3, a filtering device 220 comprises an assembly of multiple thin layers (230, 240, 250) disposed on a substrate 222 having a major surface 224. A first plurality of rows of conductive metal material 228 are disposed on substrate 222 and define an initial pattern or grid on major surface 224 to define a first metal grating layer 230. The first plurality of rows 228 has a height designated "$h_1$." An active material, like an insulator or dielectric material 232, is disposed over the first metal grating layer 230 (over the plurality of rows of conductive metal material 228) to define a second layer 240. The dielectric material 232 has a height designated "$h_2$." Finally, a second plurality of rows of conductive metal material 234 is disposed on dielectric material 232 to define a second distinct grating structure or third layer 250. The second plurality of rows 228 has a height designated "$h_3$." The second plurality of rows of conductive metal material 234 are complementary to the first plurality of rows of conductive material 228, as they are substantially vertically and horizontally aligned and define similar widths "a" on major surface 224. Together, the first plurality of rows of conductive material 228 and second plurality of rows of conductive material 234 sandwich dielectric material 232 to form a vertical microstructure 248 that creates the multi-layered assembly resonator structure. Vertical microstructure 248 has a height of "h" measured from major surface 224 where $h=h_1+h_2+h_3$ and defines a grating pattern or grid on major surface 224. Therefore, subwavelength openings or slits 252 are formed between the respective vertical microstructures 248 and have a diameter "d" represented by $d=p-a$, wherein p is the period between adjacent microstructure rows 248 and a is the diameter of the microstructure rows 248.

In certain variations, an optical spectrum filtering device generates a filtered output that exits the filter device having a predetermined range of wavelengths in the visible light range. For certain embodiments, color filter designs prepared in accordance with the present teachings optionally produce cyan, magenta, and yellow (CMY) colors (see for example, FIGS. 6A-6C), which can be used to form a pixel. In other embodiments, such as the one shown in FIGS. 10A-6D, red, green, and blue (RGB) as well as yellow primary colors can be formed. The color scheme is additive and thereby can generate arbitrary colors.

In certain variations, the optical spectrum filtering device reflection-type filter generates a filtered output that exits the filter device having a predetermined range of wavelengths in the visible light range. Such a predetermined range of wavelengths may include a color selected from the group consisting of: red, green, blue, cyan, magenta, yellow, and combinations thereof, by way of non-limiting example.

The present teachings pertain to constructing novel image pixels for displays with distinct colors by incorporating a plasmonic resonator structure. The colors are easily controlled by changing structural parameters. For example, a transmission spectrum for an exemplary color pixel can exhibit an efficiency of greater than or equal to about 60% efficiency, optionally of greater than or equal to about 65% efficiency, optionally greater than or equal to about 70% efficiency, optionally greater than or equal to about 75% efficiency, optionally greater than or equal to about 80% efficiency, optionally greater than or equal to about 85% efficiency, and in certain preferred aspects, optionally greater than or equal to about 90% efficiency which is desirably high as compared to a conventional color pixel and similar to predicted efficiency based on simulation results. Furthermore, efficiency of a filtering device for a pixel incorporating a plasmonic resonator structure can be significantly increased.

For example, in a narrow band color filter design shown in FIG. 25, a buffer layer is disposed between a metal grating comprising aluminum and a high refractive index dielectric material. A variety of buffer materials can be selected, including poly(3,4-ethylenedioxythiophene) (PEDOT) poly(3,4-ethylenedioxythiophene):poly(styrenesulfonate) (PEDOT:PSS), cesium carbonate ($Cs_2CO_3$), silicon dioxide ($SiO_2$), zinc oxide (ZnO), vanadium pentoxide ($V_2O_5$), nickel oxide ($Ni_2O$), Molybdenum oxide ($MoO_3$), and combinations thereof.

In the embodiment of FIG. 25, a low refractive index material layer is selected as a buffer and thus comprises a low refractive index dielectric material (such as $SiO_2$, where n=1.5). The low index layer has a thickness of about 50 nm and serves as a buffer layer. A high refractive index dielectric material ($Si_3N_4$) (refractive index, n=2.0) is provided adjacent to the buffer layer at a thickness of about 100 nm and serves as a modulation layer. The high index dielectric material modulation layer is disposed adjacent to a glass substrate comprising $SiO_2$. Inclusion of such a buffer layer can significantly increase transmission efficiency.

A periodicity of the grating structure is variable, so at one end, an opening between a pair of aluminum rows is greater than at a second opposite end. Thus, in the structure shown in FIG. 25A, a first period is 300 nm, a second period is 250 nm, and a third period is 450 nm. FIG. 25B shows experimental filtering results for different discrete regions corresponding to the distinct periods, where the filtered output is blue in a first region, green in a second region, and red in a third region. FIG. 25C shows a simulation for such a device structure shows wavelength versus transmission for blue, red, and green filtered light outputs, while comparative actual experimental results are shown in FIG. 25D (including the buffered layer structure), where transmission levels are desirably high for blue, red, and green as compared to the simulated results and a full width at half maximum (FWHM) ranges from about 25 to 30 nm. Such filter devices have desirably high transmission and thus have significantly improved energy efficiency.

As discussed above, subwavelength metallic gratings according to certain aspects of the present disclosure are thin and planar structures and may be easily integrated with other thin-film optical elements. For example, bilayer metal wire grids can be considered as two metal gratings separated by a certain distance (for example, separated by the dielectric or insulator material). Not only does this type of multiple layer structure show a very high extinction ratio between the lights of two orthogonal polarizations, but it also offers the advantage of easy fabrication and defect tolerance.

As shown in FIG. 11, the present disclosure provides a plasmonic nanoresonator filter device 600 for color filtering. A portion of a light source 630 is transmitted through the filter device 600 and generates a filtered output 640. The structure of the filter device 600 is as follows. A transparent substrate 602 defines a major surface 604 on which a plurality of rows 620 is formed. A resonator assembly structure 622 comprises a first electrically conductive metal grating structure 606, such as a subwavelength nanograting. The first electrically conductive metal grating structure comprises at least two openings 624 capable of transmitting a portion of an electromagnetic spectrum so as to generate a filtered output 640 having a predetermined range of wavelengths via an optical resonance mechanism. Furthermore, the openings 624 in the first electrically conductive metal grating structure 606 have at least one dimension that is less than the predetermined range of wavelengths for the filtered output. The resonator assembly 622 also comprises a dielectric material layer 608. The resonator structure 622 optionally further comprises a second electrically conductive metal element disposed along an opposite side of the dielectric material 610.

In the embodiment shown in FIG. 11, the second electrically conductive element is in the form of a second electrically conductive metal grating structure 610 disposed over dielectric material layer 608. The first electrically conductive metal grating structure 606, the dielectric material 608, and the second electrically conductive metal grating structure 610 are arranged to be substantially aligned in a horizontal and vertical orientation and thus together define the openings 624 through the resonator structure assembly 622 that generates the filtered output having the predetermined range of wavelengths. A periodicity defined by resonator assembly 620 (e.g., see period "p" which can be calculated by a+d of openings 624 of the electrically conductive grating structures 606 and 610) determines the predetermined range of wavelengths that is transmitted through the plasmonic filtering device 600.

In certain variations, the first electrically conductive metal grating structure 606 and the second electrically conductive metal grating structure 610 may comprise a metal selected from the group consisting of: gold, aluminum, silver, copper, and combinations thereof. In yet other variations, the dielectric material 608 can be selected from the group consisting of: silicon nitride ($Si_3N_4$), zinc selenide (ZnSe), zinc oxide (ZnO), zirconium oxide ($ZrO_2$), and titanium oxide ($TiO_2$). The transparent substrate 602 can be formed from conventional transparent substrates for optical devices, such as silicon dioxide ($SiO_2$) or magnesium fluoride ($MgF_2$).

One suitable optical plasmonic spectrum filtering device having a design like that in FIG. 11 thus has a subwavelength periodic MIM stack array or resonator structure assembly 622 on a magnesium fluoride ($MgF_2$) transparent film 602 with period (p). For each stack (each row 620), a 100 nm-thick zinc selenide (ZnSe) dielectric layer 606 is sandwiched by two 40 nm-thick aluminum (Al) layers (606, 610), where the thickness of the dielectric core is determined on the basis of the spatial extension of SP waves inside the dielectric ZnSe layer 608 at the visible frequencies. The 100 nm-thick ZnSe dielectric layer 608 ensures the efficient coupling of SP modes at the top and bottom edges of the stack or assembly 622, whereas the 40 nm-thick Al layer 606 prohibits the direct transmission of the incident light. The duty cycle of the stack array is about 0.7. The bottom Al grating 606 is used to couple selectively the incident light into plasmon waveguide modes by diffraction, whereas the top Al grating 610 efficiently reconverts the confined plasmons to propagating waves by scattering and transmits the light 630 to the far field in the forward direction.

FIG. 10A presents a schematic diagram of an embodiment of inventive nanoresonators like that in FIG. 11, but generating four distinct colors (red, green, blue, and yellow). For TM-polarized waves (the E-field is perpendicular to the Al grating direction), the transverse magnetic plasmon dispersion relation is plotted in FIG. 10B and the MIM structure is given by $$\varepsilon_1 k_{z2} + \varepsilon_2 k_{z1} \tanh\left(\frac{-ik_{z1}d}{2}\right) = 0 \tag{1}$$

for the antisymmetric mode, and by $$\varepsilon_1 k_{z2} + \varepsilon_2 k_{z1} \coth\left(\frac{-ik_{z1}d}{2}\right) = 0 \tag{2}$$

for the symmetric mode; kz is defined by the momentum conservation:

$$k_{z1,2}^2 = \varepsilon_{1,2}\left(\frac{\omega}{c}\right) - k_x^2 \tag{3}$$

where $\in$ is the complex dielectric constant, subscripts 1 and 2 the insulator and metal layer, and d the thickness of the insulator layer. Here, all materials are assumed to be non-magnetic so that the magnetic permeability is equal to 1. The Al/ZnSe/Al stack array has a 0.7 duty cycle and therefore the dielectric constant of the insulator layer is calculated following the effective medium theory. The complex dielectric constant of Al is described by fitting the experimentally measured data. The spatial extension of SP waves in the ZnSe layer is calculated to be about 100 nm at visible frequencies. Therefore, a 100 nm-thick ZnSe layer is selected to ensure the efficient coupling of SP modes at the top and bottom edges of the stack. Thereafter, the plasmon dispersions for the antisymmetric and symmetric modes are obtained by solving equations (1) and (2).

For TM-polarized waves (the E-field is perpendicular to the Al grating direction), the transverse magnetic plasmon dispersion of the Al/ZnSe/Al stack array is plotted in FIG. 10B. Here only normal incidence is considered and therefore the stack period is related to the plasmon transverse wave vector as P=2π/k, by the ±1st order diffraction. From FIG. 10B, it can be clearly seen that the SP antisymmetric mode has a near-linear dispersion across the whole visible range. Therefore, the SP antisymmetric modes can be used as intermediates to couple the incident plane wave selectively in and scatter the confined SP modes out to the far field. The close-to-linear dispersion makes design of the inventive filters straightforward for any colors across the entire visible band. As an example, the red, green and blue spots in FIG. 10B represent the three primary RGB colors. They have different transverse wave vectors that correspond to specific stack periods by the ±1st order diffraction. The simulated transmission spectra for RGB colors are shown in FIG. 10C. The corresponding period of the stack is 360, 270 and 230 nm that can be fabricated by micro and nanofabrication technologies. However, the TE-polarized light (the E-field is parallel to the Al wire direction) does not support the excitation of SP modes and thus there is no obvious light conversion process. As a result, the TE-polarized light is strongly suppressed at resonance wavelengths and the transmissions are extremely low. This indicates that such transmission color filters can simultaneously function as polarizing elements, a highly desirable feature for display applications.

FIG. 10D shows the simulated time-average magnetic field intensity and electric displacement (arrow) profiles in one MIM stack corresponding to the red spot in FIG. 1b. The TM-polarized incident light has a wavelength of 650 nm and the stack period is 360 nm. The magnetic field intensity shows that most of the incident light is coupled into antisymmetric waveguide modes with maximum intensity near the edges of top and bottom Al gratings, which supports the principles upon which the inventive designs are based. From the electric displacement, efficient coupling of incident light to the SP antisymmetric modes is realized by the strong magnetic response (as previously observed where the electric displacement forms a loop and results in strong magnetic fields opposing that of the incident light inside the dielectric layer).

Thus, in certain variations, the inventive plasmonic optical spectrum filtering devices serve as a polarizer device. Further, such inventive plasmonic optical spectrum filtering devices can also form a pixel for a display device, where a plurality of filtered colors can be formed in close proximity to one another. In other embodiments, a first conductive metal grating is made on top of one or two dielectric layers of different refractive indices to perform the filter function, offering such utility as high transmission and narrow bandwidth (see for example, FIG. 25). In other embodiments, a two-dimensional (2D) grid structure can be used to reduce the polarization dependence.

The control of light interaction with nanostructures and their unique applications in photonics can be used in development of nanofabrication and characterization techniques for light management. As discussed above, optical resonance effects in nanoholes, nanoslits, and related nanostructures can be used for color filter applications. According to certain aspects of the present teachings, a resonator structure can be a filtering assembly comprising multiple layers, including a first metal grating and an active material, which can be selected from a dielectric material or a photoactive material. A metal-dielectric-metal building block suitable for use as a color filter in accordance with certain embodiments of the present disclosure is similar to an organic solar cell or photovoltaic structure (in which the organic semiconductor materials are sandwiched by two conductive electrodes). In such embodiments, a photoactive material comprising an organic semiconductor is incorporated into the multilayered film assembly as an integral part of a specially designed photonic color filter for energy conversion. In certain embodiments, a photoactive material may comprise a bulk heterojunction material comprising both electron donor and electron acceptor materials commonly used in photovoltaic applications. When the light extinction occurs at the specific wavelength, light energy is absorbed by the organic semiconductor photoactive material, which produces photocurrent. Therefore, in accordance with the present teachings, in certain embodiments the devices have a design that is not only able to filter specific colors, but also generate photocurrent and thus electrical energy as a solar or photovoltaic cell.

In certain embodiments, a reflectance type color filtering device is capable of power generation. Reflective colors are brilliant and free of glare in sunlight. They are superior to transmissive filter technologies for outdoor usage, and even better under direct sunlight for more energy absorption. Therefore, in accordance with certain embodiments of the present disclosure, certain optical spectrum filtering devices are capable of recycling energy otherwise wasted in most of display applications (that require color filters to achieve desirable colors). Furthermore, organic photovoltaic (OPV) cell structures are incorporated into certain dual-function device embodiments. Therefore, the approach also takes the advantages of the OPV, such as low cost, easy fabrication, and compatibility with flexible substrates over a large area. In addition, alternative applications of OPVs are contemplated which complement the great efforts in improving power conversion efficiency (PCE) and practical fabrication methods.

Figure 4:
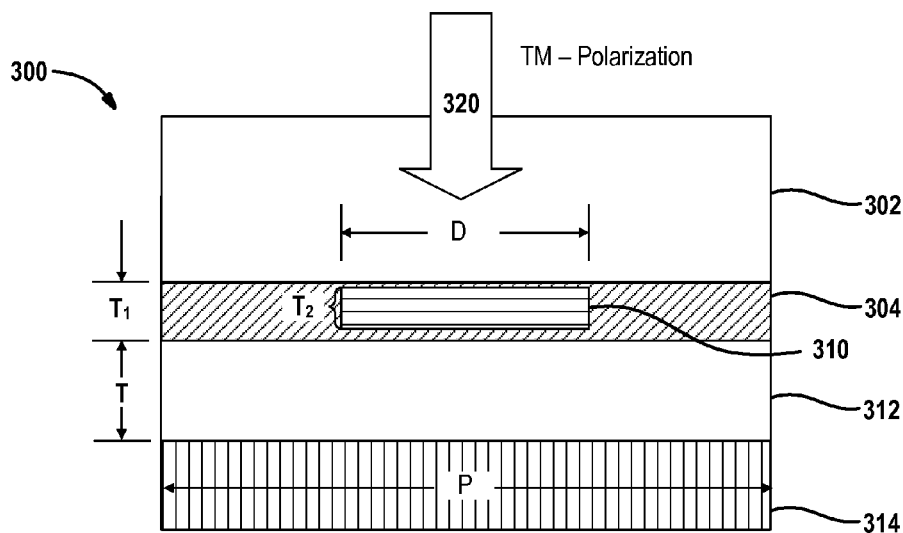
FIG. 4 is a sectional view of an exemplary inventive reflective plasmonic resonator filtering device with dual-function functioning as both a color filter and photovoltaic solar cell having a resonator assembly including a photoactive material and at least one grating in accordance with certain aspects of the present teachings.

In one exemplary embodiment shown in FIG. 4, a multi-layered dual-function photovoltaic-color filter device 300 is capable of producing desirable reflection colors and simultaneously converting absorbed light 320 to generate electricity. More specifically, a reflective spectra of pixels are made with device 300. Because the reflectance type color filters act similarly to the color paint, e.g., absorbing light corresponding to specific wavelengths, but reflecting the others, in the embodiment, the CMY color scheme is employed where cyan, magenta and yellow are three primary colors. A transparent substrate 302 may comprise glass, such as silicon dioxide (e.g., silica). A first electrode 310 is disposed in a stacking arrangement near substrate 302 and as shown in FIG. 4 is disposed within a portion of an optional buffer layer 304. For example, a buffer layer 304 can be disposed over the transparent substrate 302. The buffer layer 304 serves to enhance charge transport from the first electrode 310. The first electrode 310 may be an anode and may comprise gold or other conductive materials. The buffer layer 304 may comprise poly(3,4-ethylenedioxythiophene) (PEDOT) or alternatively, poly(3,4-ethylenedioxythiophene):poly(styrenesulfonate) (PEDOT:PSS), for example. Other suitable buffer materials include cesium carbonate ($Cs_2CO_3$), silicon dioxide ($SiO_2$), zinc oxide (ZnO), vanadium pentoxide ($V_2O_5$), nickel oxide ($Ni_2O$), Molybdenum oxide ($MoO_3$), and combinations thereof.

The multi-layered device 300 may comprise one or more photoactive organic semiconductor materials 312. The semiconductor layer 312 is adjacent to buffer layer 304. The photoactive semiconductor material layer 312 comprises a material like an organic electron donor, such as poly(3-hexylthiophene) (P3HT), combined with an organic electron acceptor, such as [6,6]-phenyl $C_{61}$ butyric acid methyl ester (PCBM) to form a combined layer of mixed P3HT:PCPM. While not limiting the present disclosure to any particular organic material system, for purposes of illustration, a conjugate polymer system of poly(3-hexylthiophene) (P3HT):[6,6]-phenyl $C_{61}$ butyric acid methyl ester (PCBM) shows a bulk heterojunction (BHJ) P3HT:PCBM blend used as an exemplary model system.

Figures 5A, 5B:
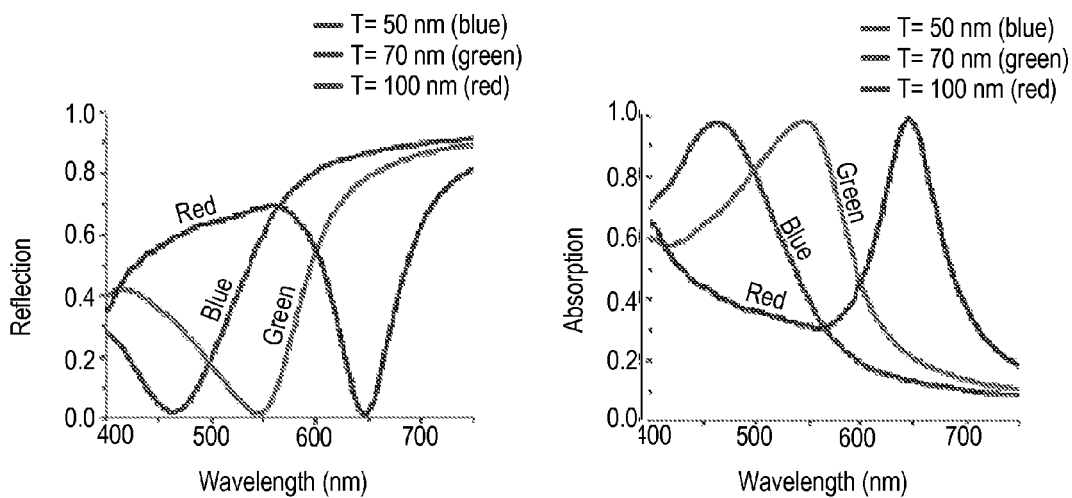
FIGS. 5A-5B show simulated reflective color filtering.

A second electrode 314 is disposed along the surface of the photoactive material layer 312. The second electrode 314 may be a transparent cathode and may comprise aluminum or other conductive materials. The second electrode 310 comprising aluminum (a cathode) can be in the form of a continuous film that sandwiches the active organic semiconductors layers (buffer layer 304 and photoactive material layer 312). In certain variations, either the first electrode or the second electrode may be a nanograting. Diameter "D" of the first anode electrode 310 is shown in FIG. 4, as is the period "P" of the structure. FIG. 5B compares the absorption behavior of the same pixels (FIG. 5C) for a structure like in FIG. 4. It should be emphasized that the color selective property of the structure shown in FIG. 5A is due to the total absorption (close to 100%) of incident light 320 at the specific wavelength range without use any antireflection layer, which reflect complementary colors.

In variations where the resonator structure can serve as a photovoltaic device, the display device can also be used as a "touch screen" display device that is capable of detecting a reduced photovoltaic output indicative of a shadow or positioning of a user's finger adjacent or near the screen. This indication of reduced photovoltaic output can be used as a user interface for receiving a user input or selection (such as a "touch screen" input). However, it should be appreciated that actual contact of the screen may not be necessary in some embodiments.

Thus, FIGS. 6A-6C present the schematic diagram of certain energy-harvesting color filters prepared in accordance with the present disclosure, where the conjugated polymer layers comprise a buffer layer 402 of poly(3,4-ethylenedioxythiophene):poly(styrenesulfonate) (PEDOT:PSS) and a photoactive material 410 of poly(3-hexylthiophene):[6,6]-phenyl $C_{61}$ butyric acid methyl ester (P3HT:PCBM) blend are sandwiched by a nanograting layer 412 comprising gold and a continuous thick film forming cathode 414 comprising aluminum. The nanograting 412 is adjacent to a transparent substrate 404 comprising glass. Each of the filter devices in FIGS. 6A-6C have different periodicity (FIGS. 6G-6I) that generates different colors as filtered output, as can be seen in FIGS. 6D-6F). The selection of each material and its role will be further explained below.

FIGS. 6G-6I shows the scanning electron microscope (SEM) images of the fabricated nanogratings. Here, gold (Au) is chosen for the nanogratings 412 due to its excellent conductivity and appropriate work function as an anode. The periodic Au nanograting structures 412 are fabricated using nanoimprint lithography (NIL), followed by a reactive ion etching (RIE), metal deposition and lift-off process, to produce large area transparent electrode onto which OPV cells can be easily fabricated. The fabrication of the complete OPV structures using those Au nanogratings 412 as an anode is as follows. First, a conductive PEDOT:PSS layer, often used in OPV structures as a hole transporting layer (and with the high work function for hole collecting) is cast on the Au nanograting anode (as a "buffer" layer 402). Such "composite" anode structures comprising metallic nanogratings 412 and a buffer layer 402 (e.g., comprising PEDOT:PSS) can ensure efficient hole collection and transport between the metal rows/lines.

Next, a high performance bulk-heterojunction (BHJ) photoactive layer 410 comprising a blend or mixture of P3HT and PCBM is constructed, serving to convert absorbed light to photocurrent (see electrical connectors 422 in FIG. 6B showing an exemplary current collection device). After thermal annealing to optimize the BHJ nanostructures in the photoactive material layer 410, a continuous Al film layer is thermally deposited as a cathode 414. Al is selected due to its excellent performance as a cathode material for the OPV cells when combined with a thin LiF layer and cost-effectiveness. An ultrathin 1 nm thick LiF film (not shown) is optionally used to improve the performance of OPV cells, but does not appear to affect the optical properties of the device. The Al layer 414 also prohibits the direct transmission of the incident light.

Following the inventive design principles and the fabrication processes described above, a filtering device for generating three distinct filtered outputs in primary CMY colors (cyan, magenta and yellow) under natural light conditions is created. First, bulk heterojunction (BHJ) active layers 410 of three thicknesses (90 nm, 65 nm and 50 nm) are formed to control the TE polarized light to generate CMY colors, respectively. Then nanogratings 412 comprising gold of three corresponding periods (420 nm, 280 nm and 220 nm) are selected to control the TM polarized light under the given photoactive layer thickness. In all three cases, the thicknesses of the Au nanogratings 412 and the buffer (PEDOT:PSS) layer 402 are 40 nm and 30 nm, respectively. All the Au nanogratings 412 have about 0.7 duty cycle (Au line width is 0.7 of the period). A light 420 is illuminated onto the color filter from the Au anode 412 side and the photograph images are taken showing distinct reflected CMY colors (filtered outputs 416C, 416M, 416Y over large areas (FIGS. 1D-1F).

Large area metallic nanostructures can be used as semitransparent electrodes for organic optoelectronics by controlling their optical transparency and electrical conductivity. Advantageously, the inventive design provides periodic metallic nanogratings in the multi-layered device, which act not only as nanostructures to modulate the incident light to generate different colors, but also as an optional semi-transparent anode for an organic photovoltaic (OPV) cell. In such structures, a low work function conductive metal film, like aluminum, can act as a cathode.

Color filters are desired to be polarization insensitive to the natural incident light. To achieve this, different design strategies can be employed for transverse electric (TE) and transverse magnetic (TM) waves, so that similar reflection spectra for both polarizations can be obtained for each color. First in certain aspects, the structure resembles a Fabry-Perot cavity. When the light impinges on the nanogratings (e.g., comprising gold), it will interfere with the waves reflected from the bottom metal element or film (e.g., a film comprising aluminum). When destructive interference occurs, the reflection spectra will reach a minimum, and the light energy of the corresponding color will be absorbed and complementary color reflected by the structure.

FIGS. 7A and 7B show the calculated reflection spectra maps for TE polarized light (the E-field is parallel to the Au nanograting direction) as a function of P3HT:PCBM blend layer thickness (FIG. 7A, Au grating period fixed at 280 nm) and as a function of Au nanograting period (FIG. 7B, blend layer thickness fixed at 50 nm), respectively. The blue regions in these maps represent the reflection minima where the light energy is absorbed by the structure. As expected from the Fabry-Pérot interference, the resonant absorption wavelength is linearly proportional to thickness of a blend layer but almost independent of the nanograting period. For TM waves (the E-field is perpendicular to the Au nanograting direction), additional consideration needs to be taken, as it is well known that TM waves can be efficiently coupled to the plasmon modes through the subwavelength grating structures.

FIG. 7C gives a calculated map of reflection spectrum for TM polarized waves as a function of Au nanograting period. Here the P3HT:PCBM blend layer thickness remains 50 nm. In addition to the absorption band produced by the Fabry-Perot interference, there are two more resonant absorption stripes (marked with white dashed lines) that originate from the splitting of SP modes in the plasmonic waveguide structures. The dispersion characteristics of these modes show strong dependence on the Au nanograting period because it provides the phase matching condition for the TM polarized light to couple to the SP mode. Taking advantage of the insensitivity of Fabry-Perot resonance to the Au nanograting period and choosing a particular period so that the TM polarized light is absorbed around the same wavelength as the TE polarized light, produces polarization independent reflection colors.

FIG. 7D shows simulated magnetic field intensity for TM and TE waves at the same resonant absorption wavelength of 490 nm. The thickness of P3HT:PCBM blend layer and the periodicity of Au nanogratings are 50 nm and 220 nm, respectively. It can be clearly seen that the field distribution for TM polarization exhibits plasmon behaviors at the Au-PEDOT:PSS and Al-P3HT:PCBM interfaces. For the TE polarization, the field distribution resembles that of conventional Fabry-Pérot interference, supporting the inventive design principles.

FIGS. 8A-8F show reflection spectra of the cyan, magenta, and yellow (CMY) colors of the device structure: simulation results by rigorous coupled wave analysis (RCWA) method (upper panel—FIGS. 8A-8C), and experimental results measured by using a broadband white light source (lower panel—FIGS. 8D-8F). As can be seen, the expected color filtering behavior is obtained, and the experimentally measured spectra are well-matched with the simulation results calculated for both polarized and unpolarized light conditions.

Finally photovoltaic properties of the reflective color filter devices are measured under amplitude modification (AM) 1.5 G simulated sunlight (at 100 mW cm$^{-2}$ intensity) and the current density versus voltage characteristics are summarized in FIG. 9. The measured power conversion efficiencies (PCEs) for the CMY color filters are 1.55%, 0.82%, and 0.60%, respectively. The cyan-colored devices are those with the thickest photoactive layer (thickness of about 90 nm), leading to sufficient light absorption in this structure, showed the best efficiency with the highest short circuit current density ($J_{sc}$) and fill factor. The magenta-colored devices have well-matched absorption near the maximum energy band of electron-donor materials P3HT, usually centered around 550 nm have the comparable $J_{sc}$ with the cyan-colored, even with the thinner photoactive layer (approximately 65 nm thickness).

The yellow-colored filters also successfully generate electrical power as OPV cells, even though they have reduced absorption around the energy band of electron-donor with the thinnest photoactive layer (about 50 nm) giving the lowest $J_{sc}$. Furthermore, because the metallic nanogratings of the present teachings simultaneously serve as the semi-transparent electrode for the solar cell, the use of wider metal lines (0.7 duty cycle) is highly desirable because this significantly reduces the resistance of the electrode, which is important for large area solar cells without degrading the power conversion efficiency (PCE). As an example, current OPV cells built on indium tin oxide (ITO) transparent electrodes still suffer from the insufficient conductance of the transparent ITO when they are made large area due to the voltage drop on the resistive electrode. Moreover, the superior flexibility of metallic nanostructures on the flexible substrate without conductance degradation under bent condition and the applicability to large area roll-to-roll processing make these dual-function devices useful to large area flexible display applications.

Another advantageous benefit is that the longitudinal thickness of such an inventive photonic color filter is less than 200 nm, which is about 2 orders of magnitude thinner than that of traditional colorant based filters (for LCD display panels). This is very attractive for the design of ultrathin colored devices.

Such reflective color filtering embodiments simultaneously integrate the OPV function into a single device. The absorbed light by the color filter, which is otherwise totally wasted, is harvested by the OPV to generate photocurrents. The dual function devices of the present teachings, which is expected provide far superior and higher efficiency in display devices and is likely to lead to significantly improved energy-efficient e-media.

Example 1

A gold nanograting is fabricated as follows: Three types of large area Au nanogratings having different periodicity (420 nm, 280 nm and 220 nm) are fabricated by nano-imprint lithography (NIL-based) processes. NIL is performed in Nanonex NX2000 nanoimprinter (Princeton, N.J.) using a $SiO_2$ mold with 0.7 duty cycle on a MRI-8030 resist (Microresist Technology GmbH) spin-casted on glass substrates, at a pressure of 600 psi and a temperature of 180° C. for 5 minutes. After cooling and demolding, Ti is selectively deposited on each sidewall of the imprinted grating structures by angled deposition. Ti deposited on the resist patterns induced the undercut structures during $O_2$ reactive ion etching (RIE), facilitating the lift-off process. $O_2$ RIE (20 sccm $O_2$, 12 mTorr chamber pressure, and 30 W bias power), deposition of 40 nm Au with 1 nm Ti using electron-beam evaporator and lift-off process completed the fabrication of Au nanograting structures on a substrate.

A dual-function device is prepared as follows: Au nanogratings on glass are cleaned in acetone and isopropyl alcohol (IPA) under sonication for 20 minutes, respectively, and treated by $O_2$ plasma for 60 seconds. Cleaned substrates are then transferred to a $N_2$ purged glove box and the filtered PEDOT:PSS (H.C. Starck, Clevios PH 500) is spin-casted onto the Au nanograting electrodes to deposit ~30 nm thick layer which is subsequently baked at 115° C. for 15 min. For the photoactive layer, P3HT (Rieke Metals Inc., 4002-E, ~91% regioregularity) and PCBM (American Dye Source, Purity: >99.5%) are used as received, and blend solutions are prepared by dissolving both components in chlorobenzene with 1:1 ratio by weight. The solution is stirred for approximately 12 hours in the $N_2$ purged glove box to give a homogeneous blend system and filtered using a 0.45 μm filter. The blend solution is spin-casted onto the PEDOT:PSS layer, and annealed at 130° C. for 20 min. The thickness of the blend film is controlled by changing the concentration of solution and the spin-coating speed. The thickness of organic layer is measured by Dektek profiler. After thermal treatment, LiF (1 nm) and Al (75 nm) are deposited by thermal evaporator at pressure of $8 \times 10^{-7}$ mbar through circular-shaped shadow masks.

Solar cell/photovoltaic performance measurements, such as current versus voltage characteristics, are measured with Keithley 2400 system by illuminating the OPV cells with AM 1.5 G simulated sun light using Oriel Solar Simulator with a irradiation intensity of 100 mW $cm^{-2}$, which is calibrated by power meter (OPHIR, Nova-Oriel) and a reference silicon solar cell.

Example 2

Plasmonic nanoresonators devices for color filtering, such as that in FIG. 10A discussed above, are formed as follows. For easy fabrication, the device is designed as a subwavelength periodic MIM stack array on a magnesium fluoride ($MgF_2$) transparent film with period P. A glass substrate is prepared using a cleaning process. A 220 nm magnesium fluoride ($MgF_2$) layer, 40 nm Al, 100 nm zinc selenide (ZnSe) and another 40 nm Al are deposited sequentially using an electron-beam evaporator with a deposition rate of 0.5 $nms^{-1}$. To prevent the Al from oxidizing, the samples are stored in an oxygen-free glove box before measurement. For each stack, a 100 nm-thick zinc selenide (ZnSe) dielectric layer is sandwiched by two 40 nm-thick aluminum (Al) grating layers. The duty cycle of the stack array is about 0.7.

Patterns are milled with the focus ion beam equipped in a Nova NanoLab DuaLbeam workstation (FEI). Milling is controlled with an AutoFIB program, provided by FEI, capable of controlling all parameters relating to ion and electron beams. The accelerating voltage is 30 kV and current varies from 50 to 100 pA, determined by the feature size. Magnification is from ×6,500 to ×10,000 for patterning. Transmission spectra are measured with an inverted microscope (Nikon TE 300; Nikon), and all optical images are taken with a camera (Nikon D3000; Nikon) mounted on the front port of the microscope.

FIG. 12A shows the optical microscopy images of the seven square-shaped plasmonic color filters illuminated by a white light. The filters are fabricated using focus ion beam milling of a deposited Al/ZnSe/Al stack on an $MgF_2$ substrate. The color filters have the stack period changing from 200 to 360 nm, corresponding to the color from violet to red. All the filters have the same area dimension of about 10 μm×10 μm. The measured transmission spectra of RGB filters are given in FIG. 12B, which agrees well with the simulation results shown in FIG. 10D. For TM illumination, stack arrays show the expected filtering behavior with absolute transmission over 50% around the resonant wavelengths, which is several orders of magnitude higher than those of previously reported MIM resonators. This transmission is comparable with the prevailing colorant-based filter used in an LCD panel, but the thickness of the plasmonic device is 1-2 orders of magnitude thinner than that of the colorant-based filters. The relative lower transmission for blue color is due to the stronger absorption loss of ZnSe in the shorter wavelength range. The full-width at half maximum of the passbands is about 100 nm for all three colors.

However, the devices strongly reflect TE-polarized light, as in wire-grid polarizers. Therefore, the transmission of TE-polarized light is suppressed as shown in FIG. 12B. This feature indicates that the structure itself can have the roles of color filter and polarizer simultaneously, which greatly benefits LCD technology by eliminating the need of a separate polarizer layer. In addition in certain embodiments, due to the conductive nature of the Al grating, a separate transparent conductive oxide layer used in LCD module is not necessary.

Besides the standard square color filters, different nanoresonator arrays can form arbitrary colored patterns on a micrometer scale. By way of example, a yellow character "M" in a navy blue background is shown in FIG. 12C. The pattern size of the "M" logo measures only 20 μm×12 μm and uses two periods: 310 nm for the yellow letter M and 220 nm for the navy blue background. The optical microscopy image of the pattern illuminated with the white light is shown in FIG. 12D. A clear-cut yellow "M" sharply contrasts the navy blue background. It is important to note that the two distinct colors are well preserved even at the sharp corners and boundaries of the two different patterns, which demonstrates that the inventive color filter scheme can be extended to ultrahigh resolution color displays.

Simulation and experiments are conducted to investigate the relationship between the opening or slit number and the filtering effect to better determine the relationship between the quantity of openings or slits as it relates to color effects. The inset of FIG. 13 shows the microscope images of the samples with 2, 4 and 6 slits (from the bottom to the top) for green and red color filters. The center-to-center distance between the neighboring slits for green and red filters is 270 and 360 nm, respectively, with slit widths of about 80 and 100 nm. Surprisingly, even the structures with only two slits already exhibit distinct colors. With more slits, the green and red colors become better defined and much brighter, and agree well with the simulation results shown in FIG. 13. This interesting behavior can be explained by the interference of the SP waveguide modes. When the incident light is coupled into the SP modes through the bottom slits, the counterpropagating SP waves inside the insulator layer from different slits interferes along the waveguide direction. Transmission will be enhanced for constructive interference at the top slits, and suppressed for destructive interference.

Fundamentally, the filtering effect of the stack array with infinite slits can also be ascribed to the multiple interferences of SP waves from each slit. The main difference between structures having a few slits and infinite slits is that the latter can efficiently couple the incident light into SP antisymmetric modes through momentum matching by diffraction, and therefore the efficiency is much higher. The above analysis and experimental results indicate that very compact structures with just a few openings or slits can still adequately perform the desired color filtering function.

Example 3

Plasmonic nanoresonators for spectral and polarimetric imaging are investigated and shown in FIGS. 14A-D. By gradually changing the periods of the plasmonic nanoresonator array, a design for a plasmonic spectroscope for spectral imaging is provided. FIG. 14A is a scanning electron microscopy (SEM) image of the fabricated one dimensional (1D) plasmonic spectroscope with gradually changing periods from 400 to 200 nm (from left to right). Scale bar, 21 μm. FIG. 14B is an optical microscopy image of the plasmonic spectroscope illuminated with white light. FIG. 14C is an SEM image of the fabricated two dimensional (2D) spoke structure. FIG. 14D are optical microscopy images of the spoke structure illuminated with unpolarized light (center) and polarized light (four boxes).

FIG. 14A shows the fabricated device comprising gradually changing periods from 200 to 400 nm that covers all colors in the visible range. When illuminated with white light, the structure becomes a rainbow stripe, with light emitting from the stack array, as shown in FIG. 14B. Plasmonic spectroscopes can disperse the whole visible spectrum in just a few micrometers distance, which is orders of magnitude smaller than the dispersion of the conventional prism-based device. This feature indicates that the color pixels formed by these structures provide extremely high spatial resolution for application in multiband spectral imaging systems. The inventive thin film stack structures can be directly integrated on top of focal plane arrays to implement high-resolution spectral imaging, or to create chip-based ultracompact spectrometers.

All structures discussed above have only one-dimensional linear slits (that is, a slit in the same direction). Here, a two dimensional 2D microscale spoke structure (FIG. 14C) having slits in different orientations and a gradual change of slit spacing is designed to further investigate spectral and polarimetric imaging responses. The spoke structure, as depicted in FIG. 14C includes 96 slits that form a circular ring. Each slit is 3 μm in length and 50 nm in width, and the inner and outer radius of the ring is about 3 and 6 μm. The spacing between neighboring slits changes from 200 nm from the centre to 400 nm towards the outer edge of the ring, covering all colors in the visible range as the above linear spectroscope. FIG. 14D shows the polarimetric response of the spoke with different illuminations. When the spoke is illuminated with unpolarized white light, the transmitted light forms a complete rainbow ring. However, if the illumination is the polarized light and the polarization is rotated, a clear dark region appears along the polarization direction. This is because of the absence of excited SPs in the polarization direction, and thus the transmission is extremely low, which is consistent with the TM coupling mechanism discussed earlier. Therefore, this two-dimensional spoke structure, when used with an imaging device, provides the ability for real-time polarimetric information in spectral imaging, or alternatively can be used as a microscale polarization analyzer.

Human eyes typically have a resolution limit of about 80 μm at 35 mm. Therefore, plasmonic nanoresonators built in accordance with the present teachings can build colored "super-pixels" that are only several micrometers in a lateral dimension and are much smaller than the resolution limit detectable by human eyes. At present, this lateral dimension is also 1-2 orders of magnitude smaller than the best high-definition color filters currently available. Furthermore, these plasmonic devices have a longitudinal thickness that is 1-2 orders of magnitude thinner than that of colorant ones, which is very attractive for the design of ultrathin panel display devices.

Besides the small dimensions, the nature of the polarization dependence of plasmonic resonators is also attractive. This feature not only benefits the applications in LCD by eliminating the need of a separate polarizer layer, but can also be used for extracting polarimetric information in spectral imaging.

Therefore, in accordance with various aspects of the present teachings, plasmonic nanoresonators are provided that disperse light with high efficiency spectrally. By arranging different resonators, arbitrary colored patterns on a micrometer scale can be achieved. These artificial structures provide an opportunity for display and imaging devices with a higher spatial resolution, as well as much smaller device dimensions than those currently available. The design principle can be easily expanded to other wavelength ranges for multispectral imaging.

The MIM grating structure discussed above in accordance with certain aspects of the present teachings is fabricated using focused ion beam. But for large-scale production, nanoimprint lithography is contemplated for fabricating these structures over large areas. For this purpose alternative structure designs that are better suited for such fabrication processes, as recognized by those of skill in the art, are likewise contemplated.

In FIGS. 15A-15C, a hybrid plasmon/waveguide structure with a single patterned Al layer on top of dielectric deposited on a glass substrate is provided. This robust, easy to fabricate structure can produce various spectra depending on the desired application by altering the period, linewidth, and thickness of the Al grating or by changing the continuous dielectric layer. FIGS. 15A-15C are TM transmission simulation results for thick Al, high index dielectric, polarizing structure (FIG. 15A) and a thin Al, lower index dielectric, high transmission structure (FIG. 15B). FIG. 15C is a schematic of the structure.

In FIGS. 15A-15B, two simulation sets are presented for different applications. The first structure which features a thick Al grating and high index dielectric (FIG. 15A) is targeted for polarizing applications such as liquid crystal displays where transverse magnetic (TM) polarized light will be transmitted with 50% efficiency at the peak while transverse electric (TE) light is almost completely suppressed (<<1%). The second which has a thin Al grating and lower index dielectric (FIG. 15B) shows a narrower spectral peak with high transmittance near ~90% at the peak wavelength.

FIG. 16A is a schematic of an alternative filter structure that contains a low index spacer layer ($SiO_2$) between metal grating (Al) and high index guiding layer or dielectric layer ($Si_3N_4$). Adding a low refractive index layer between the metal grating and the waveguide layer provides additional control parameter to obtain the desired spectra. FIG. 16B shows experimental TM transmission results obtained for such a structure with two different metal grating periods. FIG. 16B shows some initial experimental results of blue and red color filters using such a structure with two different periods, 280 nm and 420 nm, respectively. The structures are fabricated by the nanoimprint-based technique. Reflective color filters can be made in a similar fashion.

In various aspects, methods of making plasmonic optical spectrum filtering devices. Such methods include forming a resonator structure comprising an electrically conductive metal nanograting subwavelength structure and an active material selected from a dielectric material or a photoactive material via a process selected from UV photolithography, nanoimprint lithography, focused ion beam processing, stamping or metal transfer printing. In this manner, the electrically conductive metal nanograting subwavelength structure is formed that comprises at least two openings capable of transmitting a portion of an electromagnetic spectrum there through to generate a filtered output having a predetermined range of wavelengths via optical resonance.

Generally, contact printing involves transferring a material deposited on a prepatterned mold directly to a substrate with the application of uniform pressure and temperature. This process has traditionally been used to transfer metal layers to act as electrodes or masks for subsequent etch steps. Devices with multiple layers, such as metal-insulator-metal (MIM) structures of the present disclosure, can be transferred over using similar processing techniques. Using a $SiO_2$ grating mold, a MIM pattern is transferred to a flexible polycarbonate substrate in order to create a thin film, reflective color filter. This method can be used with roll-to-roll nanoimprint lithography and can be used to efficiently fabricate large-area structures on various substrates for display applications.

In recent years, contact patterning methods such as nanoimprint lithography (NIL) have been increasingly used as low-cost processes to create nanosized features. NIL itself has been used for years to efficiently create nanoscale features over large areas, but scientists continued to research methods for large-scale, direct transfer of nanostructures onto various substrates without the need for precise etching processes. Microcontact printing or "soft lithography," utilizing elastomeric stamps such as polydimethylsiloxane (PDMS) has been used to transfer self-assembled monolayer patterns which can effectively act as a mask for wet etching into various substrate materials ranging from metals to biomolecules. Metal transfer processing is a more recent method which involves metal films deposited on a patterned mold being transferred directly to a substrate due to chemical bonding or higher surface adhesion to the substrate as opposed to the mold. This technique has been used primarily to create etch masks for various applications, but transparent metal electrodes for organic light emitting diodes and polymer solar cells have also been studied.

Metal transfer printing does not have to be limited to single layers. Multilayer devices such as metal-insulator-metal (MIM) structures can be transferred over to substrates using the same low pressure and temperature processing utilized in traditional single layer procedures. Because this process can be applied with various types of materials, these structures can be used for applications such as metamaterials, plasmonic devices, and, thin film color filter structures. This process has advantages over other methods used to fabricate the MIM structures mentioned above because it can efficiently create devices on flexible substrates as well as hard materials that have an intermediate polymer layer and, by utilizing roll-to-roll NIL, can be used to create large area devices.

Suitable methods for forming multiple layer optical device structures, including forming thin film active material layers (like dielectric materials or photoactive materials) or grated metal structures are described in U.S. Pat. No. 7,648,767 to Fu, et al. entitled "MATERIAL COMPOSITION FOR NANO- AND MICRO-LITHOGRAPHY" and U.S. Patent Publication No. 2009/0256287 (application Ser. No. 12/421,333 filed on Apr. 9, 2009) to Fu, et al. entitled "UV CURABLE SILSESQUIOXANE RESINS FOR NANOIMPRINT LITHOGRAPHY," International Patent Application No. PCT/US2011/27748 to Park et al. filed on Mar. 9, 2011 entitled "Methods of Making Organic Photovoltaic Cells Having improved Heterojunction Morphology," and in U.S. Patent Publication No. 2009/0046362 (application Ser. No. 12/100,363 filed on Apr. 9, 2008) to Guo et al. entitled "Roll To Roll Nanoimprint Lithography," the relevant portions of each of which is incorporated herein by reference in its respective entirety.

MIM structures have been experimentally demonstrated to act as plasmonic resonators for filtering specific frequencies of light. Using focused ion beam fabrication, a plasmonic transmissive color filter has been fabricated that can allow specific frequency bands to transmit while all others are effectively blocked, effectively creating red, green, or blue colors with sharper resonances and higher transmission intensities than previous reports of thin film color filtering. Such filters exploit a MIM structure, in which the top metal grating couples light with a transverse magnetic (TM) polarization (magnetic field parallel to the grating lines) at certain frequencies into the plasmonic waveguide structure while a bottom metal grating efficiently couples the light out to the far field.

Reflective color filter structures are provided based on similar principles for display applications, such as electronic readers and portable displays, which use natural light to create color images. With this objective in mind, an alternative embodiment related to MIM grating structure is shown in FIG. 17A. This structure couples in specific frequencies of light but, with the absence of a bottom grating, the light is effectively trapped and absorbed by the film while reflecting light at all other frequencies. Using this principle, a cyan, magenta, or yellow (CMY) color spectrum is readily created by simply varying the grating period. Simulated reflection spectra based on rigorous coupled wave analysis for TM polarized light are shown in FIG. 17B, while transverse electric (TE) polarized light is expected to be almost completely reflected at all wavelengths.

Example 4

These particular experiments are performed using a hard $SiO_2$ mold due to the ease of creating deep structures, but this technique could certainly be used with soft molds such as PDMS. The full process for transfer to a flexible substrate is outlined in FIGS. 18A-18D. To begin with, a $SiO_2$ grating mold, approximately 1×1 in$^2$, is fabricated using conventional NIL and pretreated with a fluoro-surfactant. The entire MIM stack is then deposited onto the mold through subsequent evaporation and sputtering steps. First, a 5 nm layer of Au is deposited prior to a 30 nm Al layer by e-beam evaporation, since Au has weaker adhesion to the $SiO_2$ mold, allowing for easier transfer. Following these steps, a 40 nm $TiO_2$ layer is also deposited using e-beam evaporation. Finally, a 100 nm Al layer is sputtered over the top of the mold. Sputtering is chosen to allow for a more continuous deposition of the Al film. Some infiltration between the evaporated structures is still possible; however, as evaporation progressed, the line width gradually grew to allow a more continuous Al layer (bottom layer in FIGS. 19A-19B). FIG. 18B shows a diagram after the deposition processes. The mold is then placed in contact with a flexible, polycarbonate (PC) substrate and a uniform pressure and temperature of 50 psi and 160° C., respectively, are applied for 5 min for an efficient transfer. The Nanonex NX2000 imprinter is used for this step. After cooling, the PC substrate in FIG. 18C is then peeled off the mold to realize the final structure, shown in FIGS. 19A-19B. It is important to note from the image that some particulates deposited on the sidewalls during evaporation and sputtering can still be transferred over during this process but, as discussed later, this did not greatly affect any test results.

Reflection spectrum measurements are taken using a Filmetrics F20 system. Angular reflection measurements are taken using a Woollam variable angle spectroscopic ellipsometer (WVASE32). Reflection simulations are run using COMSOL MULTIPHYSICS. Scanning electron microscope (SEM) images are taken using a Philips XL30 EEG SEM.

A plasmonic color filter to reflect yellow light is fabricated. To obtain optimized yellow filter, a 220 nm period mold with a large duty cycle (>80%) is used to create a thin film with high confinement of the complementary blue wavelengths while allowing all others to reflect. SEM images of the top and cross-section view of the structure after transfer from this mold onto PC are shown in FIGS. 19A-19B. The simulated reflection spectrum is compared with that taken from the sample using a normally incident source/collector setup (Filmetrics F20). New simulations are performed to include material loss and index of refraction changes over the visible spectrum. These data are collected by spectroscopic ellipsometry for thin films of both Al and $TiO_2$ to develop a more accurate simulation model. The results are shown in FIGS. 20A and 20B for TE and TM polarized light, respectively.

In FIGS. 20A-20D, there are three key features. First, the TM polarized graph shows very good matching between the experimental and simulated data. The resonance wavelength is nearly the same as predicted and can be easily changed by altering the period of the structure. The bandwidth of the results is larger than the simulations due to possible effects from particulates and linewidth variations, but it is believed that this can be controlled with better deposition conditions and improved $SiO_2$ mold fabrication. The second is the strong degree of coupling that is shown, because the resonance has a near 0% reflectance while values at other wavelengths climb to nearly 70%, providing a high color contrast between wavelengths. The third feature is the structure's apparent strong coupling of TE polarized light at similar wavelengths to the TM. While not fully understood, it is believed that based upon some of simulation results, variance in the thickness of the dielectric layer as well as the top Al layer can have strong effects on the TE spectrum.

Once again, the measured spectrum shows a wider bandwidth and further studies will be performed to determine its exact nature. On the other hand, the polarization insensitivity could be a highly desirable feature for practical color filter applications. This lack of complete polarization dependence also provides a strong visual representation of this structure's capabilities. FIG. 20C shows a photograph of the front side of the sample in unpolarized light with a distinct yellow color, as compared with the grayish color from the sputtered Al as viewed from the back side of the sample [inset in FIG. 20C].

Another useful feature of the structure, especially for practical applications, is the low dependence of the samples' reflection spectra on the viewing angle between the source and collector. FIGS. 21A-21C shows the reflection spectra for TE, TM, and unpolarized light taken at angles between the source and detector of 20°, 30°, and 50° using a spectroscopic ellipsometer. Data are collected using an Al mirror as a reference with corrections added due to angle variance using ellipsometer data and the WVASE software. While there are some intensity variations in the TE/TM spectra, resonance wavelength is not greatly shifted and the unpolarized data show no major change in the resonance or intensity throughout the measurements. This can also be seen in the photograph in FIG. 20D that is taken at a relatively steep angle, but still shows the yellow reflected color of the sample. This structure appears to be quite suitable for being utilized for reflective technologies at various angles and demonstrates minimal angle dependence.

Metal transfer lithography can provide a large-scale, inexpensive method for creating metal patterns on various substrates. By demonstrating a successful transfer of a uniform MIM structure over a 1×1 in$^2$, such metal transfer techniques can be extended to produce functional devices and multilayer structures using a variety of combinations of materials. A yellow reflective color filter is fabricated with a distinct absorption bandwidth and low angular dependence by simply depositing multiple layers of material on a patterned mold and transferring onto a flexible PC substrate. Such processes are applicable to other period gratings, for example, gratings that create cyan and magenta colors, for a working display. Other fabrication techniques that are contemplated include top-down processes such as traditional NIL or newly developed methods such as dynamic nano-inscribing. These structures can be readily fabricated over large areas for a wide range of reflective display applications and that the successful transfer of MIM structures can provide faster, cheaper fabrication of various other multilayer structures.

In certain embodiments, a display device is provided that comprises a display pixel of a display screen comprising a plasmonic resonator structure for color filtering via optical resonance comprising an electrically conductive metal grating structure and an active material selected from a dielectric material or a photoactive material. The electrically conductive metal grating structure comprises at least two openings capable of transmitting a portion of an electromagnetic spectrum generated by the display device to generate a filtered and polarized output having a predetermined range of wavelengths.

In certain embodiments, like that shown in FIGS. 22-24, a display device 500 is a liquid crystal display device. While a liquid crystal display is used as an exemplary device for purposes of illustration, it should be noted that the inventive filtering devices can also be designed for incorporation into a variety of display devices as recognized by those of skill in the art, including projection displays (such as using digital mirror technology, or liquid crystal on silicon (LCoS), eye-wear displays, complementary metal-oxide-semiconductor (CMOS) image sensors, IR imagers, light emitting diodes, by way of non-limiting example.

In the context of FIG. 23, to the extent that elements of the LCD display are commonly shared with a conventional design like that in FIG. 1, the same reference numbers are used. A display pixel 501 includes a front polarizer 32, a first transparent conductor electrode 50, and a plurality of liquid crystals 64 capable of passing a predetermined range of polarized electromagnetic waves of wavelengths in response to an applied voltage. A plasmonic resonator structure 550 is disposed on an opposite side of the plurality of liquid crystals 64 as the first transparent electrode 514, where the electrically conductive metal grating structure 524 serves as a second transparent conductive electrode and the plasmonic resonator structure 550 (which may be combined with another polarizer sheet) serves as a rear polarizer.

Along the lower bottom side which receives light to be processed is a first transparent substrate 24 (e.g., a glass substrate), while along the upper top side a front polarizer 32 is adjacent to a second transparent substrate 34. On the bottom side, a transparent lower conductor 40 (or electrode) is disposed adjacent to a lower alignment layer 42 (having a surface morphology that induces a predetermined orientation of liquid crystals upon application of current thereto). While not shown, similar to FIG. 1 external electrical contacts can connect one or more metallic elements of the plasmonic resonator structure 550 to the first transparent electrode 50.

A liquid crystal compartment (60) is formed by one or more seals (not shown) in contact with the resonator structure 550 and an upper alignment layer 52 (that serves to provide an orientation to the liquid crystals when electric potential is applied). The liquid crystal compartment contains a plurality of liquid crystals 64. Two spacers 66 are also disposed within the liquid crystal compartment 60. The upper transparent conductor (or electrode) 50 is adjacent to the upper alignment layer 52. In certain variations, the resonator structure 550 has a surface 510 with a morphology that induces a predetermined orientation of the liquid crystals, much like the upper alignment layers (or the resonator structure 550 further includes an optional alignment layer as surface 510, not shown). The upper alignment layer 42 and lower alignment layer/resonator structure surface 510 facing the liquid crystal compartment 60 have complementary surface morphologies that induce a preferred orientation for the liquid crystals 64 when voltage or electrical potential is applied to permit light to transmit and rotate through the liquid crystals.

Thus, when electrical potential is applied to the upper and lower conductors 50, 550, the liquid crystals 64 are oriented such that white light (generated within the display device) is permitted to pass through the resonator structure 550, into the liquid crystals 64, which is then transmitted out of the front polarizer 32 to provide a filtered colored light. In the absence of electrical potential applied to the conductors/electrodes 50, 550, the liquid crystals 64 are randomly oriented and no incident light passes through the liquid crystal compartment. As shown in FIG. 22, LCD pixels (e.g., 501) of panel display 500 frequently have an array of multiple color filter assemblies, for example including three adjacent red, green, blue filters that can be tuned to provide one of a red-green-blue "RGB" color upon selective activation. Notably, in the design of the LCD pixel 501, a conventional color filter and black matrix, as well as a rear polarizer can be eliminated altogether.

A photoactive material optionally comprises an organic electron donor material comprising poly(3-hexylthiophene) (P3HT) and an organic electron acceptor material comprising [6,6]-phenyl $C_{61}$ butyric acid methyl ester (PCBM). The plasmonic resonator structure 550 further comprises a second electrically conductive metal electrode element 532 and serves an organic photovoltaic device capable of generating a photocurrent as well as the filtered and polarized output. In certain variations, the organic photovoltaic device is capable of converting light energy received through at least a portion of the display screen. The display screen is integrated with the organic photovoltaic device. Furthermore, in certain embodiments, such a display screen is capable of functioning as a touch screen.

In one exemplary embodiment, a detailed side profile is shown in FIG. 24 (showing a portion of a pixel with a plasmonic resonator structure 550) that is a multi-layered dual-function photovoltaic-color filter device capable of producing desirable reflection colors and simultaneously converting absorbed light 560 to generate electricity. More specifically, a reflective spectra of pixels are made with device (see FIG. 22). Because the reflectance type color filters act similarly to the color paint, e.g., absorbing light corresponding to specific wavelengths, but reflecting the others, in the embodiment, the CMY color scheme is employed where cyan, magenta and yellow are three primary colors. A transparent substrate 502 may comprise glass, such as silicon dioxide (e.g., silica). A first conductive transparent electrode 504 comprising indium tin oxide (ITO) is disposed in a stacking arrangement near substrate 502 and as shown in FIG. 24 is disposed within a portion of an optional buffer layer 506 to enhance charge transport from the first electrode 504. The first electrode 504 may be an anode and may comprise ITO or other transparent conductive materials. The buffer layer 506 may comprise cesium carbonate ($Cs_2CO_3$). The multi-layered structure 550 may comprise one or more photoactive organic semiconductor materials 508. The semiconductor layer 508 is optionally adjacent to a second buffer layer 510, such as vanadium oxide ($V_2O_5$). The photoactive semiconductor material layer 508 comprises a material like an organic electron donor, such as poly(3-hexylthiophene) (P3HT), combined with an organic electron acceptor, such as [6,6]-phenyl $C_{61}$ butyric acid methyl ester (PCBM) to form a combined layer of mixed P3HT:PCBM. While not limiting the present disclosure to any particular organic material system, for purposes of illustration, a conjugate polymer system of poly(3-hexylthiophene) (P3HT):[6,6]-phenyl $C_{61}$ butyric acid methyl ester (PCBM) shows a bulk heterojunction (BHJ) P3HT:PCBM blend used as an exemplary model system.

A second electrode 512 is disposed over the second buffer layer 510 along the surface of the photoactive material layer 508. The second electrode 512 may be a transparent cathode and may comprise aluminum, gold, silver, copper, or other conductive materials. The second electrode 512 comprising aluminum (a cathode) can be in the form of a continuous film that sandwiches the active organic semiconductors layers (buffer layers 506, 510) and photoactive material layer 508). In certain variations, either the first electrode 504 or the second electrode 512 may be a nanograting, although in FIG. 24 only second electrode 512 is a nanograting. The conductive metal structures can serve as an electrode to tune an orientation of a plurality of liquid crystals in a liquid crystal display. A filtered output 570 is generated from the plasmonic resonator structure 550 at a predetermined range of wavelengths, which is capable of serving as both a color filter and a polarizer in the LCD display pixel in FIGS. 22-23.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display device comprising:
    a display pixel of a display screen comprising a plasmonic resonator structure for color filtering via optical resonance comprising an electrically conductive metal grating structure and an active material selected from a dielectric material or a photoactive material, wherein the electrically conductive metal grating structure comprises at least two openings capable of transmitting a portion of an electromagnetic spectrum generated by the display device to generate a filtered and polarized output having a predetermined range of wavelengths.

2. The display device of claim 1, wherein the display device is a liquid crystal display device, wherein the display pixel further comprises:
    a front polarizer;
    a first transparent electrode;
    a plurality of liquid crystals capable of passing a predetermined range of polarized electromagnetic waves of wavelengths in response to an applied voltage; and
    the plasmonic resonator structure disposed on an opposite side of the plurality of liquid crystals as the first transparent electrode, wherein the electrically conductive metal grating structure serves as a second transparent conductive electrode and the plasmonic resonator structure serves as a rear polarizer by itself or in combination with another polarizer sheet.

3. The display device of claim 1, wherein the photoactive material comprises an organic electron donor material comprising poly(3-hexylthiophene) (P3HT) and an organic electron acceptor material comprising [6,6]-phenyl $C_{61}$ butyric acid methyl ester (PCBM).

4. The display device of claim 1, wherein the plasmonic resonator structure further comprises a second electrically conductive metal electrode element and serves an organic photovoltaic device capable of generating a photocurrent as well as the filtered and polarized output.

5. The display device of claim 4, wherein the organic photovoltaic device is capable of converting light energy received through at least a portion of the display screen.

6. The display device of claim 4, wherein the display screen is integrated with the organic photovoltaic device and is capable of functioning as a touch screen.

7. The display device of claim 1, wherein the electrically conductive metal grating structure serves as a transparent conductive electrode.

8. A method of plasmonic optical spectrum filtering, comprising:
    filtering an electromagnetic spectrum by optical resonance of a plasmonic resonator structure comprising an electrically conductive metal grating structure and an active material selected from a dielectric material or a photoactive material to generate a filtered output having a predetermined range of wavelengths.

9. The method of plasmonic optical spectrum filtering of claim 8, wherein a periodicity of the electrically conductive grating structure determines the predetermined range of wavelengths that is transmitted.

10. The method of plasmonic optical spectrum filtering of claim 9, wherein the predetermined range of wavelengths of the filtered output is in the visible light range and has a color selected from the group consisting of: cyan, yellow, magenta, red, green, blue, and combinations thereof.

11. A method of making plasmonic optical spectrum filtering device, the method comprising:
    forming a resonator structure comprising an electrically conductive metal nanograting subwavelength structure and an active material selected from a dielectric material or a photoactive material via a process selected from UV photolithography, nanoimprint lithography, focused ion beam processing, stamping, or metal transfer printing, wherein the electrically conductive metal nanograting subwavelength structure comprises at least two openings capable of transmitting a portion of an electromagnetic spectrum there through to generate a filtered output having a predetermined range of wavelengths via optical resonance.

12. An optical spectrum filtering and photovoltaic device comprising:
    a resonator structure for color filtering via optical resonance that serves as a first transparent conductive electrode;
    a photoactive material; and
    a second electrode, wherein the first transparent conductive electrode is disposed on a first side of the photoactive material and the second electrode is disposed on a second opposite side of the photoactive material to form the optical spectrum filtering and photovoltaic device that is capable of generating both a photocurrent by converting light energy and a filtered and polarized output having a predetermined range of wavelengths.

13. The optical spectrum filtering and photovoltaic device of claim 12, wherein the first transparent electrode comprises at least two openings capable of transmitting a portion of an electromagnetic spectrum to generate the filtered and polarized output having the predetermined range of wavelengths.

14. The optical spectrum filtering and photovoltaic device of claim 12, wherein the first transparent electrode comprises a first electrically conductive grating structure comprising at least two openings and the second electrode comprises a second electrically conductive grating structure comprising at least two openings, wherein the first and second electrically conductive grating structures are capable of transmitting a portion of an electromagnetic spectrum to generate the filtered and polarized output.

15. A plasmonic optical spectrum filtering device comprising:
a resonator structure comprising a first electrically conductive metal grating structure disposed on first side of a dielectric material and a second electrically conductive metal grating structure disposed on a second opposite side of the dielectric material, wherein the first electrically conductive metal grating structure, the dielectric material, and the second electrically conductive metal grating structure together define at least two openings through the resonator structure capable of transmitting a portion of an electromagnetic spectrum to generate a filtered output having a predetermined range of wavelengths via optical resonance.

16. The plasmonic optical spectrum filtering device of claim 15, wherein the first electrically conductive metal grating structure and the second electrically conductive metal grating structure comprise a metal independently selected from the group consisting of: gold, aluminum, silver, copper, and combinations thereof.

17. A plasmonic optical spectrum filtering device comprising:
a resonator structure comprising an electrically conductive metal grating structure and a dielectric material, wherein the electrically conductive metal grating structure comprises at least two openings capable of transmitting a portion of an electromagnetic spectrum to generate a filtered output having a predetermined range of wavelengths via optical resonance and the electrically conductive metal grating structure serves as an electrode to tune an orientation of a plurality of liquid crystals.

18. The plasmonic optical spectrum filtering device of claim 17, wherein the electrically conductive metal grating structure comprises a metal selected from the group consisting of: gold, aluminum, silver, copper, and combinations thereof.

19. A display device comprising a display screen incorporating the plasmonic optical spectrum filtering device of claim 17 as a pixel.

20. The plasmonic optical spectrum filtering device of claim 15, wherein the resonator structure further serves as a polarizer device.

21. The plasmonic optical spectrum filtering device of claim 15, wherein the first and second electrically conductive metal grating structures are subwavelength grating structures where the at least two openings have at least one dimension that is less than the predetermined range of wavelengths.

22. The plasmonic optical spectrum filtering device of claim 15, wherein a periodicity defined by the at least two openings determines the predetermined range of wavelengths that is transmitted in a transmission-type filtering device or reflected in a reflection type filtering device.

23. A display device comprising a display screen incorporating the plasmonic optical spectrum filtering device of claim 15 as a pixel.

24. The plasmonic optical spectrum filtering device of claim 15, wherein the predetermined range of wavelengths of the filtered output is in the visible light range and has a color selected from the group consisting of: cyan, yellow, magenta, red, green, blue, and combinations thereof.

25. The plasmonic optical spectrum filtering device of claim 15, wherein the dielectric material is selected from the group consisting of: silicon nitride ($Si_3N_4$), zinc selenide (ZnSe), zinc oxide (ZnO), zirconium oxide ($ZrO_2$), and titanium oxide ($TiO_2$).

26. The plasmonic optical spectrum filtering device of claim 15, wherein the resonator structure further comprises a buffer material disposed between either the first electrically conductive metal grating structure and the dielectric material and/or between the second electrically conductive metal grating structure and the dielectric material, wherein the buffer is selected from the group consisting of: a poly(3,4-ethylenedioxythiophene):poly(styrenesulfonate) (PEDOT:PSS) material, cesium carbonate ($Cs_2CO_3$), silicon dioxide ($SiO_2$), zinc oxide (ZnO), vanadium pentoxide ($V_2O_5$), nickel oxide ($Ni_2O$), Molybdenum oxide ($MoO_3$), and combinations thereof.

* * * * *